United States Patent [19]

Sugiyama et al.

[11] Patent Number: 5,636,315

[45] Date of Patent: Jun. 3, 1997

[54] VIDEO PRINTER HAVING A KEY SIMPLIFIED IN OPERATION

[75] Inventors: Naoshi Sugiyama; Toshiaki Fujimaki; Katsuo Nakadai, all of Asaka, Japan

[73] Assignee: Fuji Photo Film Co., Ltd., Kanagawa, Japan

[21] Appl. No.: 697,255

[22] Filed: Aug. 21, 1996

Related U.S. Application Data

[63] Continuation of Ser. No. 201,457, Feb. 24, 1994, abandoned.

[30] Foreign Application Priority Data

| Feb. 26, 1993 | [JP] | Japan | 5-038308 |
| Feb. 26, 1993 | [JP] | Japan | 5-038355 |
| Feb. 26, 1993 | [JP] | Japan | 5-038531 |

[51] Int. Cl.⁶ ............... H04N 5/76; H04N 5/765
[52] U.S. Cl. ............................ 386/46; 386/68
[58] Field of Search ............. 386/46, 68, 120, 386/121, 127, 129, 130; 355/19, 122; 358/296; H04N 5/76, 5/765

[56] References Cited

U.S. PATENT DOCUMENTS

| 4,782,355 | 11/1988 | Sakai et al. | 348/372 |
| 4,882,747 | 11/1989 | Williams | 348/15 |
| 5,109,284 | 4/1992 | Jung | 358/335 |
| 5,111,300 | 5/1992 | Nam | 358/906 |
| 5,140,435 | 8/1992 | Suzuki et al. | 358/335 |
| 5,392,076 | 2/1995 | Fujiwara | 348/715 |

*Primary Examiner*—Thai Q. Tran
*Assistant Examiner*—Huy Nguyen

[57] ABSTRACT

Upon detecting a freeze button depressed, while a tape is played back on a video tape player, a system control of a video printer supplies the tape player with a control signal to stop the playback operation on the tape. In the state in which the playback operation on the tape is stopped, a subsequent depression of the freeze button causes the system control to send out a control signal to instruct the tape player to initiate the playback operation on the tape, and a storing of picture signals in a frame memory causes the system control to send out the control signal to instruct the tape player to stop the playback operation.

6 Claims, 23 Drawing Sheets

Fig. 4a V_SYNC

Fig. 4b STATUS SIGNAL

Fig. 4c RECORDER CONTROL

VIDEO PRINTER HAVING A KEY SIMPLIFIED IN OPERATION

This application is a continuation of application Ser. No. 08/201,457 filed on Feb. 24, 1994, now abandoned.

BACKGROUND OF THE INVENTION

1. Field of the Invention

The present invention relates to a video printer, and more particularly to a video printer of the type which is adapted to receive a picture signal from a video tape recorder having a camera incorporated therein, for example, and print a desired still image while developing the image signal to a monitor device.

2. Description of the Related Art

For example, when images captured using a video tape recorder having a camera incorporated therein such as an 8 mm video camera, (hereinafter simply referred to as camera recorder) are reproduced on a video monitor device, one who desires that some of the images displayed on the monitor device be printed uses a video printer.

The conventional video printer has a video input terminal to which a reproduced signal is received from a camera recorder and a video output terminal from which the reproduced signal is delivered to a monitor device. Between the input and output terminals, there are provided a line over which the received, reproduced signal from the camera recorder is directly transmitted to the monitor device, and another line to which coupled is a frame memory in which some frame of signal involved in the reproducing signal is stored. If it is desired that a picture signal is stored in the frame memory, a button or key for taking signal in or freeze button, which is provided on the outer surface of the printer casing, is depressed, so that the associated frame of picture signal is written into the frame memory. In order to monitor a picture represented by the picture signal stored in the frame memory, a frame selector button is depressed, so that instead of the reproduced, movie signal representative of movie images from the camera recorder, data representative of a still image involved in the frame memory is delivered to the monitor device. If the still image thus displayed is desired one to be printed, a print button is depressed to read out the picture signal from the frame memory to a printer section, which will in turn print an image based on the picture signal.

Further, as an especial function of the video printer, there is known a so-called index printing in which a plurality of frames are reduced into a single, index frame and then printed. In this case, a mode selector key or button is operative to select an indexing mode in which the freeze button is depressed, at the moment a desired frame of image is reproduced, in a similar way as mentioned above, so that that frame of image is stored. Then, advancing the reproducing procedure, a successive frame of image is stored in the same key operation. This operation is sequentially repeated for a plurality of frames desired so that a desired number of frames of picture signal are stored in the frame memory. Each of the picture signals stored in the memory is thinned to one-sixteenth by a signal processing circuit such as a digital signal processor, and sequentially stored in a memory for use in the index printing. The plurality of images of picture signal thus thinned and stored in the memory are, in response to the print button depressed, printed in the form of a single frame of index image or multiple image on a sheet of print paper.

However, in the prior art mentioned above, while a desired, full frame of image is printed in the video printer, a playback operation on the tape is continuously performed at the camera recorder. Thus, when the monitor screen is switched to a camera recorder image, or movie image, after the printing is terminated, the playback of camera recorder images has often extensively proceeded from the image just subjected to the printing. Consequently, if the operator wishes to print or observe an additional field recorded in a portion of the tape that has already passed over, then he or she will be obliged to rewind the tape. In order to avoide that difficulty to print a desired image, one usually manipulates the video printer in such a manner that he or she depresses the freeze button of the printer to take a picture signal in, and the stop button of the camera recorder to temporarily halt the movie playback, and thereafter carries out the printing operation on the video printer. Therefore, in the case where one wishes to print a plurality of frames of image, he or she would be obliged to inherently manipulate a lot of operational keys on the different devices, that is, the camera recorder and the printer. Specifically, the operator depresses on the various devices in sequence, for example, the playback button of the camera recorder, the freeze button of the printer, the stop button of the camera recorder, and the field selector and print keys of the printer, and returns to the playback button of the camera recorder. Thus, the prior art system involves the difficulty that the key operation is troublesome.

Further, according to the prior art mentioned above, when the operator whishes to make an index frame, he or she has to watch the monitor screen while playing a video tape back, and thus it would take a remarkable time to print one index frame. In order to reduce such an extended period of time, it could be considered that the operator manipulates the camera recorder to feed a tape forward and pause at a predetermined interval to take images in at the intervals, so that the index frame is formed in a rather simpler way. In this case, the operator watches the counter of the camera recorder to allow the tape to be fed forward to a predetermined position. At the time the tape reaches the desired position, the operator makes the camera recorder playback in a regular reproducing mode, and when the tape speed becomes constant, he or she depresses the freeze button to take the image in. Subsequently, the operator opearates the recorder to feed the tape forward again, and when the tape reaches a predetermined position, the operator makes the camera recorder playback in a regular reproducing mode again, and depresses the freeze button to take another image in. The repetition of this operation makes it possible to load the printer with a plurality of images and thus to build the index frame in a shorter period of time. In this case, however, many operations not only on the printer but also the camera recorder are carried out. Therefore, when the operator wishes to form an index frame, he or she would be obliged to manipulate the separate devices, namely, the camera recorder and the printer. Thus, the prior art system involves the problem that the operation on the different devices is also troublesome when forming an index frame.

SUMMARY OF THE INVENTION

It is therefore an object of the present invention to provide a video printer free from the difficulties which would otherwise encounter in operation when a desired image is taken in from the camera recorder.

It is another object of the present invention to provide a video printer free from the difficulties which would otherwise encounter in operation when an index frame is built.

In order to achieve the object of the invention, there is provided a video printer connected between a reproducing apparatus for reproducing picture signals on a recording medium and a monitor apparatus for receiving picture signals and displaying images based on the received picture signals, wherein while the picture signals from the reproducing apparatus are supplied to the monitor apparatus, a desired frame of image is printed in the form of a still image, the printer comprising: storage means for storing therein at least one frame of picture signals from the reproducing apparatus; first operation means, having a first manually operating member, responsive to operation of the first operating member for receiving a desired frame of picture signals in the storage means; second operation means, having a second manually operating member, responsive to operation of the second operating member for causing a still image to be printed; and control means responsive to operation of either said first or second operation means for controlling at least one of operations including reproducing and stop of said reproducing apparatus and a preparation for the operations of reproducing and stop of said reproducing apparatus.

In accordance with another aspect of the present invention, there is provided a video printer connected between a reproducing apparatus for reproducing picture signals representative of images recorded in a movie fashion on a recording medium and a monitor apparatus for receiving picture signals and displaying images based on the received picture signals, wherein while the picture signals received from said reproducing apparatus are output to said monitor apparatus, a desired frame of image is printed in the form of a still image, said printer comprising: storage means for storing therein at least one frame of picture signals from said reproducing apparatus; a signal fetching button for causing, when actuated, the picture signals to be stored in said storage means; selection and output means for selecting either of the picture signals stored in said storage means and the picture signals reproduced from said reproducing apparatus, and for outputting selected one of the picture signals to said monitor apparatus; and control means for supplying, when said signal fetching button is actuated to cause a frame of picture signals to be stored in said storage means, said selection and output means with a selection signal to select and output the picture signals stored in said storage means, and said reproducing apparatus with a control signal to stop the reproducing of the picture signals.

According to still another aspect of the invention, there is provided a video printer connected between a reproducing apparatus for reproducing picture signals recorded on a recording medium and a monitor apparatus for receiving picture signals and displaying images based on the received picture signals, wherein while the picture signals from said reproducing apparatus are supplied to said monitor apparatus, a desired frame of image is printed in the form of a still image, said printer comprising: storage means for storing therein at least one frame of picture signals from said reproducing apparatus; storing means for storing a desired frame of picture signals in said storage means; print operation means, having a manually operating member, responsive to operation of said operating member for causing a still image to be printed; and control means responsive to said print operation means for instructing said reproducing apparatus to reproduce the picture signals.

In accordance with still another aspect of the invention, there is provided a video printer connected between a reproducing apparatus for reproducing picture signals representative of images recorded in a movie fashion on a recording medium and a monitor apparatus for receiving picture signals and displaying images based on the received picture signals, wherein while the picture signals received from said reproducing apparatus are output to said monitor apparatus, a desired frame of image is printed in the form of a still image, said printer comprising: storage means for storing therein at least one frame of picture signals from said reproducing apparatus; a signal fetching button for causing, when actuated, the picture signals to be stored in said storage means; a print button for causing, when actucated, a still image to be printed based on one frame of picture signals stored in said storage means; and control means for supplying, when said signal fetching button is actuated to store a frame of picture signals in said storage means, said reproducing apparatus with a stop signal to stop the reproducing of the picture signals, and in this state, when said print button is actuated to perform a printing operation for the still image according to the picture signals stored in said storage means, said reproducing apparatus with a playback signal to start the reproducing.

Further in accordance with still another aspect of the invention, there is provided a video printer connected between a reproducing apparatus for reproducing picture signals recorded on a recording medium and a monitor apparatus for receiving picture signals and displaying images based on the received picture signals, wherein while the picture signals from said reproducing apparatus are supplied to said monitor apparatus, a desired frame of image is printed in the form of a still image, said printer comprising: control means for causing said reproducing apparatus to be in either of a standby state and an operative state; and detecting means for detecting which of the states said reproducing apparatus is in a process from fetching picture signals from said reproducing apparatus to printing the still image, wherein said video printer is adapted for printing a desired frame of image.

According to still another aspect of the invention, there is provided a video printer connected between a reproducing apparatus for reproducing picture signals representative of images recorded in a movie fashion on a recording medium and a monitor apparatus for receiving picture signals and displaying images based on the received picture signals, wherein while the picture signals received from said reproducing apparatus are output to said monitor apparatus, a desired frame of image is printed in the form of a still image, said printer comprising: first storage means for storing therein image data of plural frames of picture signals from said reproducing apparatus; signal processing means for forming a reduced image from the image data of respective plural frames of picture signals stored in said first storage means; second storage means for storing therein picture signals representative of the reduced image formed by said signal processing means; a signal fetching button for causing, when actuated, the picture signals to be stored in said first storage means; and control means for generating, when said signal fetching button is actuated, a control signal to repeatedly instruct said reproducing apparatus to perform reproducing and feed forward operations, and upon monitoring reproducing and feed forward states of said reproducing apparatus, generating timing signals for storing the picture signals in said first storage means, forming the reduced image in said signal processing means and storing the signals of the reduced image into said second storage means.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 3:
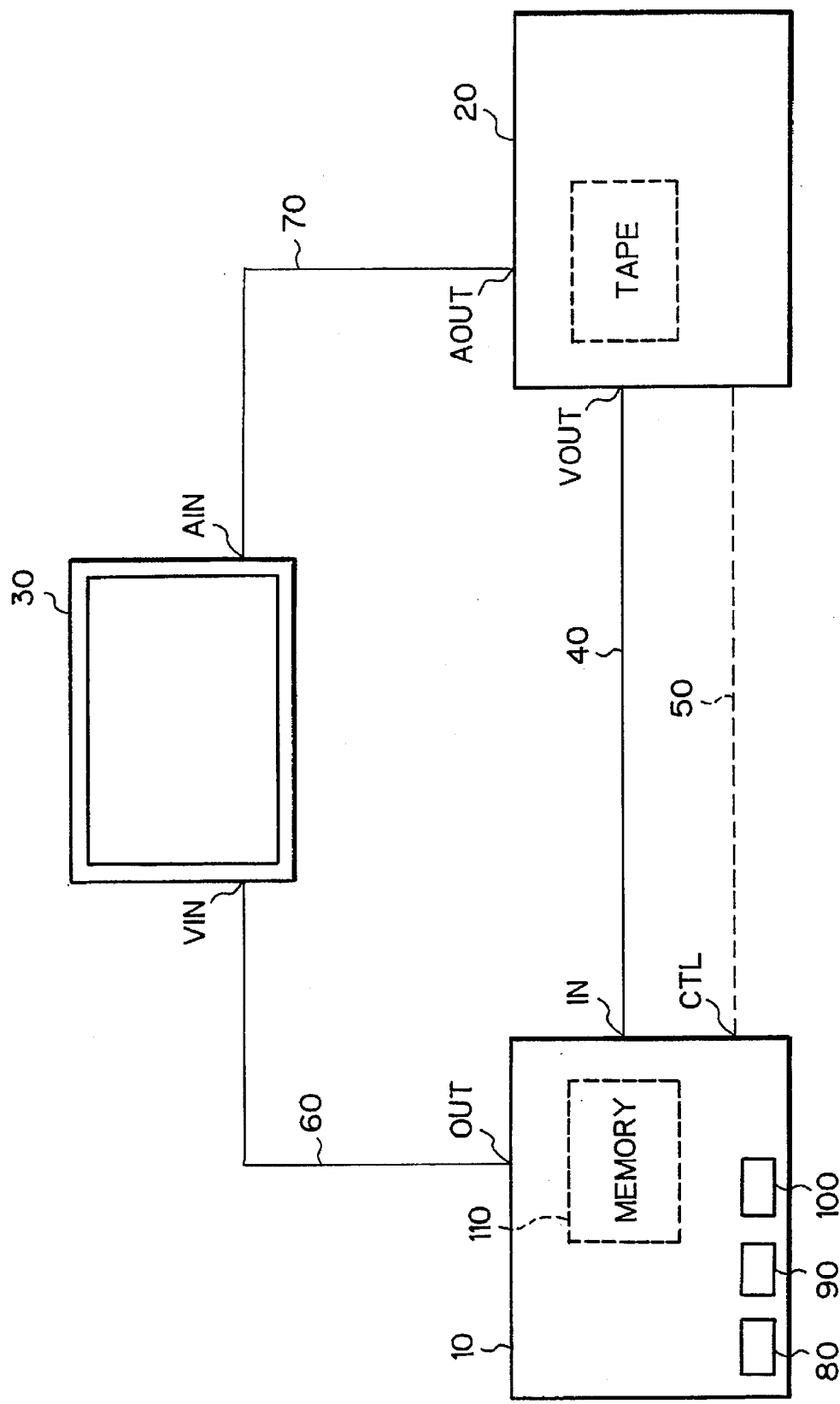
FIG. 3 schematically shows the video printer interconnected to other devices according to the present invention.

Now referring to the accompanying drawings, a preferred embodiment of a video printer of the present invention will be described. Referring first to FIG. 3, the video printer 10 according to the embodiment of the present invention is connected between an image recording and reproducing apparatus, such as an 8 mm video camera (hereinafter referred to as a camera recorder) 20 and a video monitor 30 adapted to receive a picture signal such as an NTSC standard television signal or the like to display on its screen the picture or image represented by the received picture signal.

The video printer 10 and the camera recorder 20 are coupled to each other by a first signal line 40 and a control line 50. The first signal line 40 interconnects a video output VOUT of the camera recorder 20 to a video input terminal IN of the video printer 10, over which line 40 a reproduced signal is supplied from the camera recorder 20 to the video printer 10. The control line 50 interconnects the camera recorder 20 to a control terminal CTL of the video printer 10, on which line 50 control signals are transferred between the camera recorder 20 and the video printer 10 in a both-way fashion. Specifically, according to the present embodiment, a control signal for controlling the camera recorder 20 is supplied from the video printer 10 on the control line 50. The video printer 10 and the video monitor 30 are coupled to each other by a second signal line 60 on which a picture signal is supplied from a video output terminal OUT of the video printer 10 to a video input VIN of the video monitor 30. The camera recorder 20 and the video monitor 30 are coupled to each other by an audio signal line 70 over which a signal to be recorded is supplied from an audio output AOUT of the camera recorder 20 to an audio input AIN of the monitor apparatus 30.

The video printer 10 according to the embodiment is provided with at least a power switch 80, a freeze button or key 90 or a signal storage button for instructing a storing of signals in a memory, and a print button or key 100 for instructing a printing operation. In addition, the video printer 10 has a frame memory 110 in which at least one frame of picture signal generated from the camera recorder 20 is stored when the freeze button is depressed. The picture signal stored in the frame memory 110 is read out therefrom when the print button 100 is depressed, and then subjected to a printing process so that the still image represented by the picture signal is printed out. Specifically, according to the present embodiment, there is provided such an arrangement that, when the freeze button 90 is depressed, a control signal is transmitted to the camera recorder 20 so as to stop or pause the tape, while a printing is carried out.

Figure 1:
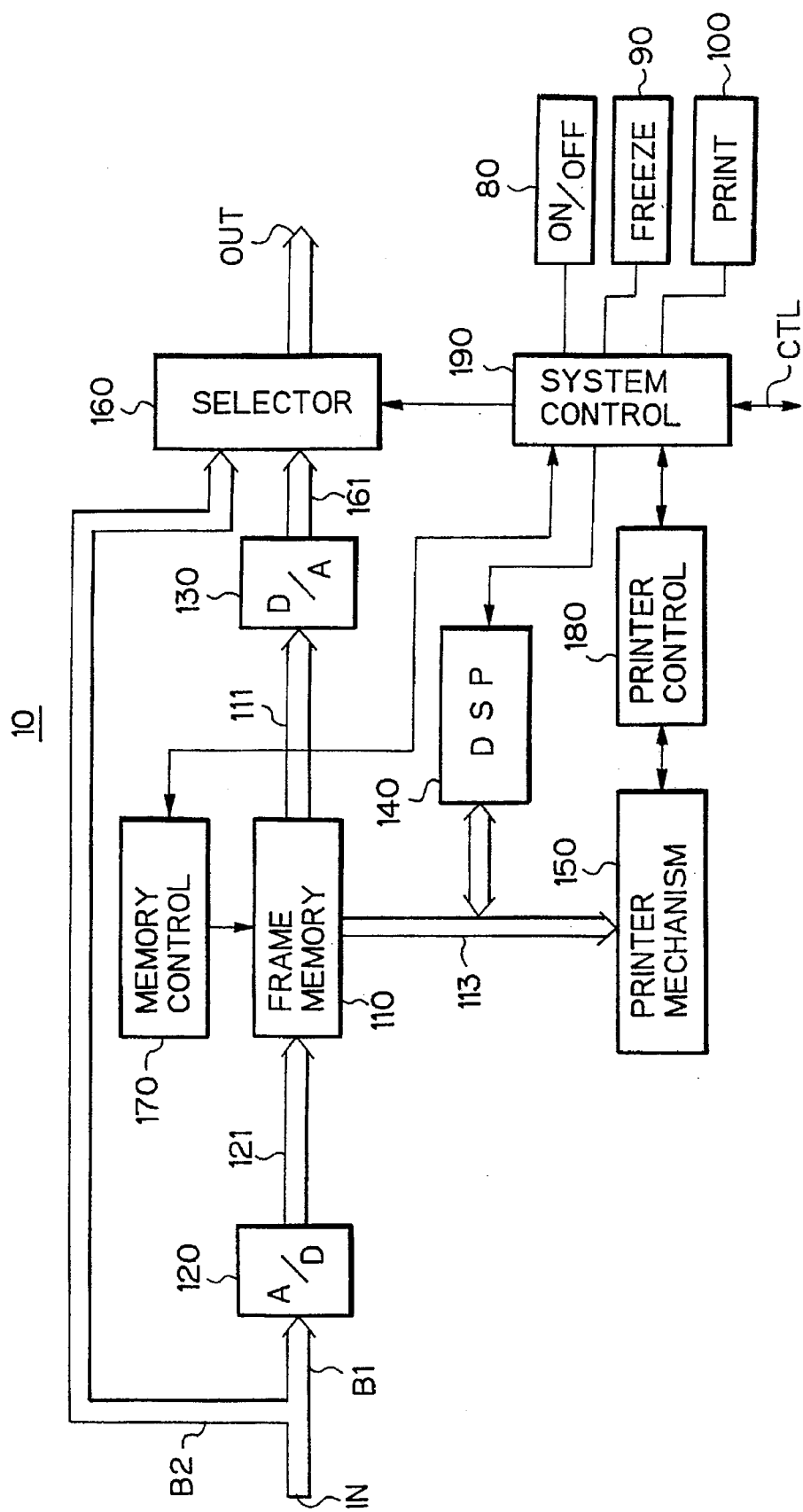
FIG. 1 is a schematic block diagram showing an illustrative embodiment of a video printer according to the present invention.

Next, the internal structure of the video printer 10 will be described referring to FIGS. 1 and 2. First, in FIG. 1, the video printer 10 is adapted to receive at the video input terminal IN the picture signal transmitted from the camera recorder 20. The video input terminal IN is connected to a first bus B1 and a second bus B2 which are branched. Connected to the first bus B1 is an analog-to-digital (A/D) converter 120 for converting an analog picture signal from the camera recorder 20 to eight bits of digital signal, for example. The A/D converter 120 has an output 121 coupled to an input of the frame memory 110.

The frame memory 110 is constituted of a video RAM or a like rewritable storage device and has a storage capacity capable of storing at least one frame of image data, or advantageously a plurality of frames of image data. The frame memory 110 has two outputs one of which 111 is coupled to a digital-to-analog (D/A) converter 130 for converting digital data read out from the frame memory 110 to a corresponding analog picture signal. The other output 113 of the frame memory 110 is coupled through a signal processing circuit 140 to a printer mechanism 150 including a thermal print head and the associated structure. The signal processing circuit 140 is constituted of a digital signal processor (DSP) for processing data to be printed derived from the memory 110. In the processing, for example, Y-C data in the form of a television format, which comprises a luminance signal (Y) and a chrominance signal (C) from the memory 110, is converted into data for use in printing of yellow (Ye), magenta (M), cyan (Cy) and black (K). The print mechanism 150 is adapted to print an image based on the data derived from the digital signal processor 140.

On the other hand, the second bus B2 connected to the video input terminal IN is coupled to a selector 160 for selecting a monitor output. The selector 160 has another input 161 coupled to an output terminal of the D/A converter 130. An output from the D/A converter 130 represents a frame of picture image stored in the frame memory 110, that is, a still image. While, the signal from the second bus B2 represents the output of the camera recorder 20, that is, a movie image. The selector 160 serves as selecting those images to deliver the selected image from the output terminal OUT thereof to the monitor apparatus 30. The selector 160 is switched in response to a control signal derived from a system control 190.

The system control 190 sends out a control signal, when any of the buttons 80, 90 and 100 is depressed, to the associated sections or units. For example, when it is detected that the freeze button 90 is depressed, the system control 190 sends out a control signal instructing a signal-storing or loading to a memory control 170, which controls reading out and writing in data to the memory 110. Further, when the print button 100 is depressed, the system control 190 sends out a control signal instructing printing to the signal processing circuit 140 and a printer control 180. Specifically, the system control 190 according to the present embodiment is adapted to generate a selector or switching signal for the selector 160 and a control signal controlling the camera recorder 20 in connection with the regular processings.

Figure 2:
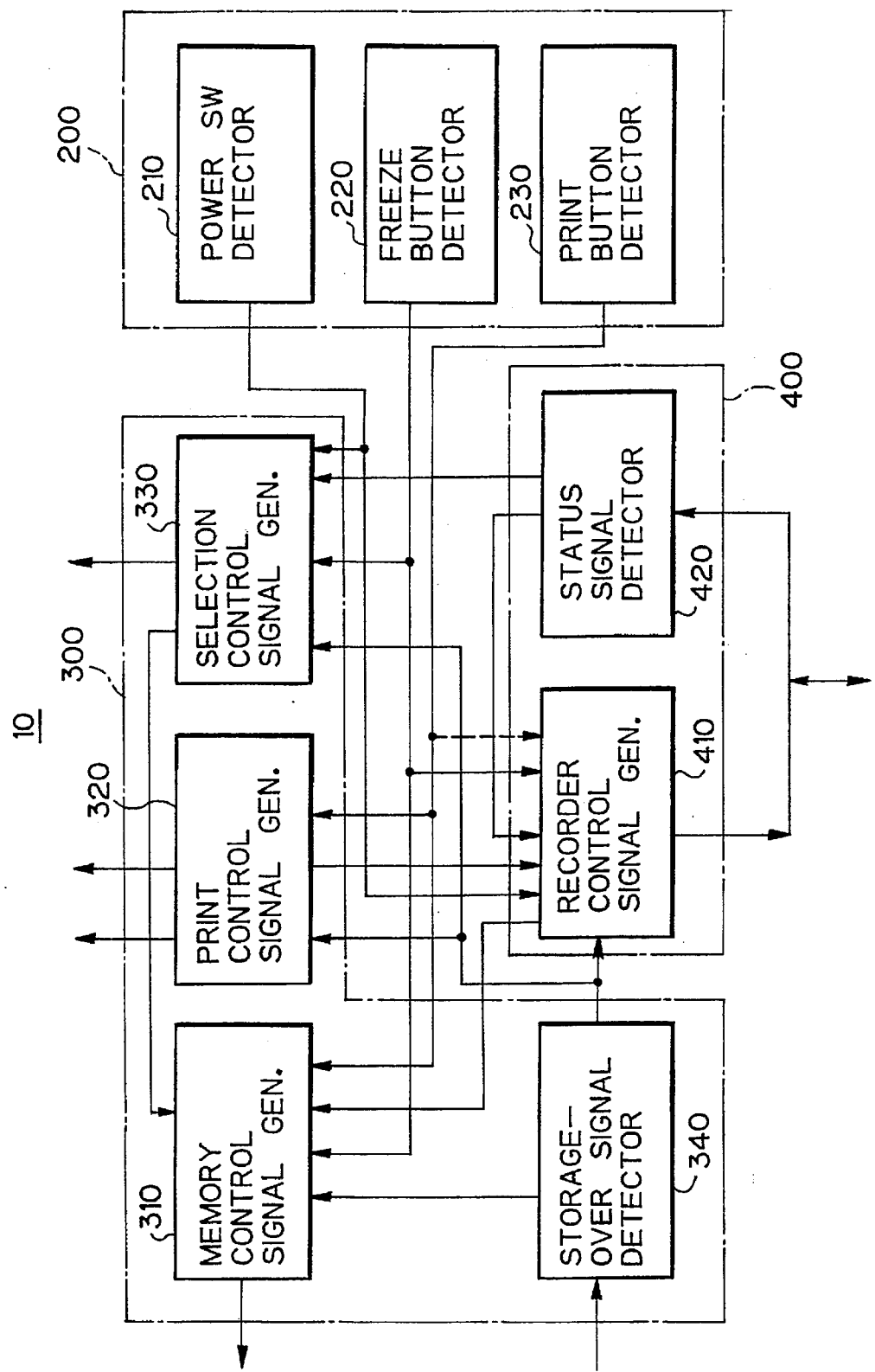
FIG. 2 is a functional block diagram showing the system control of the video printer shown in FIG. 1.

In detail, as shown in FIG. 2, the system control 190 includes a button depression detecting or key touch sensor section 200, an internal control signal processing section 300 and a camera recorder control signal processing section 400. The button depression detecting section 200 is adapted for detecting a depression of the buttons 80, 90 and 100 mounted on the outer surface of the casing of the apparatus, and for informing the associated control signal processing sections 300 and 400 of the button depression thus sensed. According to the present embodiment, the button depression detecting section 200 has a power switch depression detector 210, a freeze button depression detector 220 and a print button depression detector 230. The internal control signal processing section 300 serves as transferring to the controllers 180 and 170, and the signal processing circuit 140 control signals instructing the processings and also itself to receive counter control signals from the associated control circuits, so that those controllers and processing circuit can sequentially perform the appropriate processings. Further, the internal control signal processing section 300 also serves to transmit to the selector 160 a control signal to switch the output thereof. The internal control signal processor 300 comprises, for example, a memory control signal generator 310, a print control signal generator 320, a selection control signal generator 330 and a storage-over signal detector 340. The camera recorder control signal processor 400 is adapted for monitoring the status of the camera recorder 20 and for generating and transmitting a control signal to control the camera recorder 20 via the control line 50. The camera recorder control signal processor 400 comprises a camera recorder control signal generator 410 and a status signal detector 420.

To describe the functions of the structural elements, first, in the button depression detecting section 200, the power switch depression detector 210 serves to detect a depression of the power switch 80 and send out a power-on signal to a power supply control, not shown, for supplying electric power to the associated circuitry and the camera recorder control signal generator 410. The freeze button depression detector unit 220 serves to detect a depression of the freeze button 90 and send out a freeze signal to the memory control signal generator 310 and the camera recorder control signal generator 410. The print button depression detector unit 230 serves to detect a depression of the print button 100 to send out a print signal to the print control signal generator 320, the memory control signal generator 310 and the camera recorder control signal generator 410.

In the internal control signal processing section 300, the memory control signal generator 310 serves as supplying to the memory control 170 a control signal instructing loading the memory 110 with a signal and reading out the signal therefrom. Specifically, upon receipt of the freeze signal from the freeze button depression detector 220 in a tape playback mode of the camera recorder 20, or upon receipt of the playback start signal from the camera recorder control signal generator 410 while stopping playback, the memory control signal generator 310 transmits a signal for allowing picture signals to be received to the memory control 170. Further, upon receipt of the print signal from the print button depression detector 230 after having stored the signal into the memory 110, or upon receipt of the control signal, from the selection control signal generator 330, to instruct a signal selection from the memory 110, the memory control signal generator 310 transmits to the memory control 170 a control signal to instruct the read out of the signal from the memory 110.

The print control signal generator 320 functions as sending out to the signal processing circuit 140 and the print control 180 a control signal to instruct the printing. More specifically, upon receipt of the print signal from the print button depression detector 230 in the state in which the picture signal is stored in the memory 110, the print control signal generator 320 transmits a print instruction signal to the signal processing circuit 140 and the print control 180. When the printing is terminated, generator 320 transmits a print-over signal to the camera recorder control signal generator 410. The selection control signal generator 330 adapted to send out a switching signal to switch the selector 160. Specifically, upon receipt of the power-on signal from the power switch depression detector 210 and in addition a playback start signal from the status signal detector 420, the selection control signal generator 330 tranfers to the selector 160 a selection signal to select a signal involved in the movie image on the second bus B2. Further, upon receipt of the freeze signal from the freeze button depression detector 220 and in addition a storage-over signal from the storage-over signal detector 340, the selection control signal generator 330 transmits to the selector 160 and the memory control signal generator 310 the selection signal to switch the image selection mode from the selection of the signal involved in the movie image on the second bus B2 to that of the signal involved in the still image from the memory 110 via the digital-to-analog converter 130. Furthermore, upon receipt of the playback start signal from the status signal detector 420, the selection control signal generator 330 transmits to the selector 160 the selection signal to select the signal appearing on the second bus B2. The storage-over signal detector 340 is responsive to the storage-over signal from the memory control 170 for informing the print control signal generator 320, the selection control signal generator 330 and the camera recorder control signal generator 410 of the fact that the storage of the memory 110 is completed.

In the camera recorder control signal processor 400, the camera recorder control signal generator 410 serves to generate and send out a control signal for controlling the camera recorder 20 over the control line 50. Specifically, upon receipt of the freeze signal from the freeze button depression detector 220 in the signal reproducing state of the camera recorder 20 as well as the detection signal from the storage-over detector 340 and the detection signal from the status signal detector 420, the camera recorder control signal generator 410 transmits to the camera recorder 20 a stop signal to stop or halt the playback operation. Further, upon receipt of the freeze signal from the freeze button depression detector 220 in the stop state of the camera recorder 20, the camera recorder control signal generator 410 transmits a start signal to start the playback operation to the camera recorder 20, and in addition informs the memory control signal generator 310 of the playback start. Thereafter, upon receipt of the detection signal from the storage-over detector 340 and the detection signal from the status signal detector 420, the camera recorder control signal generator 410 again transmits the stop signal to the camera recorder 20. The camera recorder control signal generator 410 has a circuit, not shown, for counting the storage-over signals from the storage-over detector 340, and provides such a control that the playback start signal and the stop signal are repeatedly transferred to the camera recorder 20 at the above-mentioned timing until the count included in the counter reaches a predetermined value.

Figure 4:
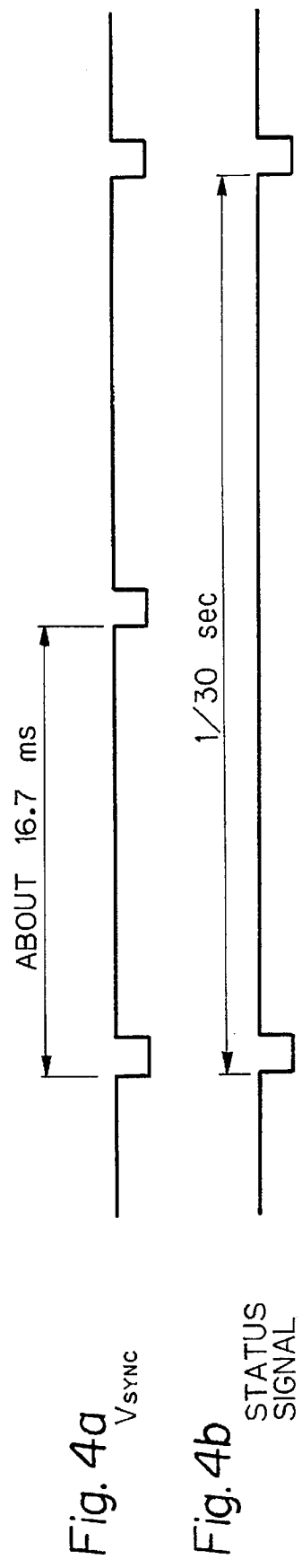
FIG. 4 plots, by way of example, signals obtained from the camera recorder shown in FIG. 1.
Figure 5:
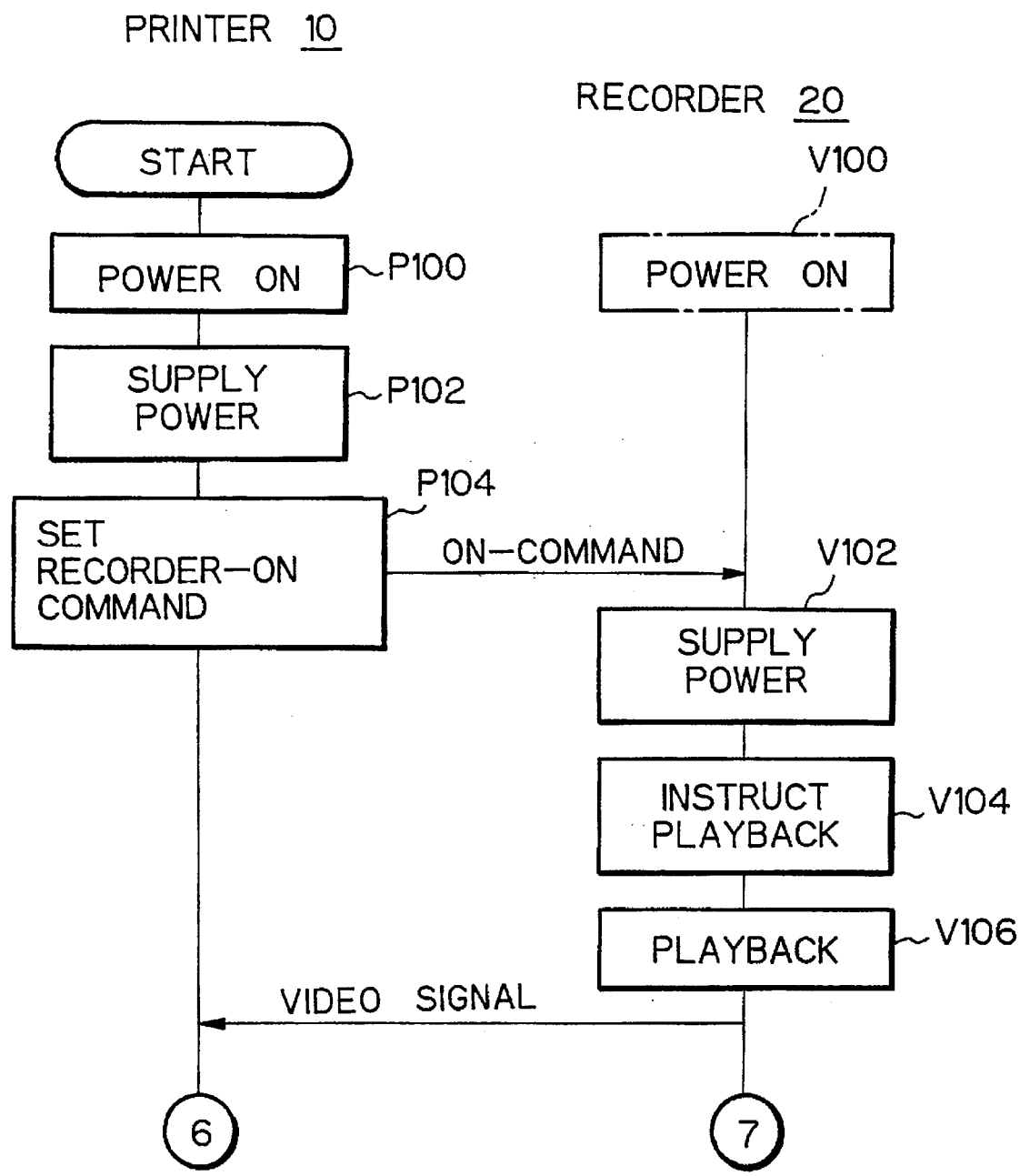
FIGS. 5-10 are a flow chart useful for understanding the operation of the embodiment of the video printer and the camera recorder shown in FIG. 1.
Figure 6:
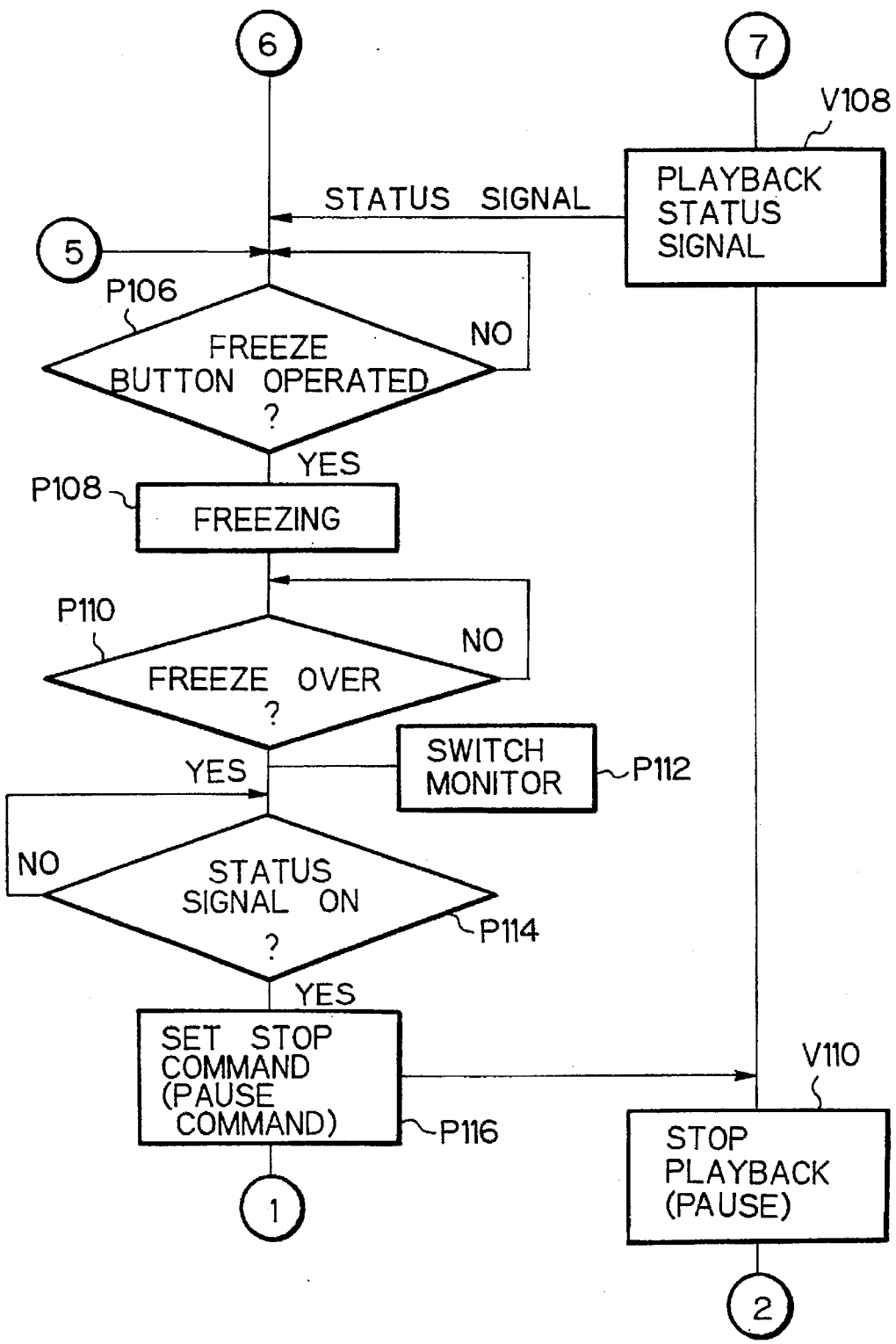

The status signal detector 420 is a circuit responsive to the status signal supplied from the camera recorder 20 on the control line 50 for sending out the detection signal to the camera recorder control signal generator 410 and the selection control signal generator 330. The status signal from the camera recorder 20 includes, for example, as shown as the middle signal in FIG. 4, a status signal allowing a frame of image to be reproduced, at about, for example, 1/30 of a second. The status signal is synchronous with a vertical sync signal, shown as the top signal, and being about 16.7 ms, for example, included in the picture signal in the playback state. The recorder control is shown at the bottom, with each increment equalling 8 bits. In addition, there are included a stop status in which the playback stops or pauses with the camera recorder 20 and a playback-over status in which the playback of the tape has been completed.

Next, the operation of the video printer mentioned above will be described in conjunction with the operation of the camera recorder 20 referring to the flow charts of FIGS. 5–10. First, referring to FIGS. 5 and 6, in step V100, a main power switch of the camera recorder 20 is turned on, and in step P100 involved in the printer 10, the power switch 80 thereof is turned on. In step P102, the system control 190 of the printer 10 detects the turn-on of the power switch 80 and supplies the electric power to the circuitry of the printer 10. In step P104, the system control 190 issues a command to turn the camera recorder 20 on and transmits the command to the system control of the recorder 20 over the control line 50. In response, the camera recorder 20 proceeds to step V102 in which the power is supplied to the appropriate circuits of the camera recorder 20.

Next, in step V104, an operator depresses the playback key or button of the camera recorder 20. Thus, in step P106, the tape is played back so that a picture signal is supplied on the first signal line 40 to the video input terminal IN of the video printer 10. At that time, in the camera recorder 20, in step V108, a playback status signal, which includes a status signal synchronized with a vertical sync signal, is transmitted on the control line 50 to the system control 190 of the video printer 10. Upon receipt of the playback status signal, the system control 190 detects the first status signal so as to switch the selector 160 to select the signal on the second bus B2. The monitor output OUT in turn issues the reproduced signal from the camera recorder 20, so that the movie image reproduced by the camera recorder 20 is displayed on the video monitor 30. The operator depresses the freeze button 90 of the video printer 10, while monitoring the pictures on the screen of the monitor 30, when a desired picture is displayed on the monitor screen. The depression of the freeze key 90, in step P106, is detected by the system control 190, which in turn transmits a storage start signal to the memory control 170. Upon receipt of the storage start signal, in step P108, FIG. 6, the memory control 170 transmits a write control signal to the frame memory 110 so as to store the corresponding one frame of picture signals from the camera recorder 20. When the frame of picture signals has been stored in the memory 110, the memory control 170 transmits a storage-over signal to the system control 190.

In step P110, the system control 190 detects the storage-over signal and transmits a signal to switch the selector 160. Then, in step P112, the selector 160 switches the signal from the second bus B2 to the signal of the still image from the memory 110 through the D/A convertor 130. As a result, the monitor 30 displays the still image to be printed on its screen. Meanwhile, in step P114 when the system control 190 detects on the control line 50 the status signal synchronous with the vertical sync signal, it makes up a command to stop the camera recorder 20 and transmits this command to the camera recorder 20. Thus, the camera recorder 20 stops the playback of the tape in the state in which reproduction of the frame of image subsequent to what has been taken in into the printer 10 is ready to start.

Next, referring to FIGS. 7–10, in step V112 the camera recorder 20 builds the stop status and informs the system control 190 of the video printer 10 of that status. Upon receipt of the signal representing the stop status, in step P118, the system control 190 becomes in the state waiting for a depression of the print button 100. In this state, when the print button 100 is depressed with the operator's confirmation on the monitor screen, in step P120, the system control 190 responds to the depression and transmits a print instruction signal to the memory control 170, the signal processing unit 140 and the printer control 180. Then, the image data stored in the memory 110 is read out therefrom, the read data is subjected to the signal processing in the signal processing unit 140, and the printing is implemented based on the processed image data by the printer mechanism 150.

If the operator wishes to print a succesive frame of image near the frame now on display, the freeze button 90 is again depressed. In step P122, the system control 190 responds to the depression of the freeze button 90, and in step P124 issues a command starting playback of the camera recorder 20 to transmit the command over the control line 50 to the camera recorder 20. Upon receipt of the playback start command, in step V114, the camera recorder 20 starts playing the tape back and again transmits the reproduced signal on the first signal line 40 to the printer 10. Also in this case, similar to the manner as mentioned above, the playback status signal is supplied on the control line 50 to the system control 190. In this manner, the system control 190 again transmits the data read signal to the memory control 170 so that the memory 110 stores continuously the reproduced images. When the memory 110 has stored the successive frame of picture signal, the memory control 170 transmits the storage-over signal to the system control 190. In step P126, upon receipt of the storage-over signal, the system control 190 detects in step P128 the status signal on the control line 50. Thereafter, the process goes to step P130.

In the step P130, the stop command is built and then transmitted to the camera recorder 20. Thus, in step V118, the camera recorder 20 stops playing back the tape. Also in this case, similar to the manner mentioned above, the camera recorder 20 transmits the stop status to the system control 190 of the printer 10. The system control 190 confirms the stop of the tape playback, and in step P132 determines whether or not the number of frames of image frozen reaches a predetermined number N, for example, three pieces. In this case, the steps P124–P132 are repeated until the number of frames of image frozen reaches three. Namely, the start of the tape playback of the camera recorder 20, the signal storage and the stop of the playback are repeated so that the memory 110 takes in a plural number of frames of still image data. When the number of frames of image frozen reaches the predetermined number of pieces, the process goes to step P134 in FIG. 9, in which the system control 190 is in the state waiting for a depression of the print button 80.

Figure 9:
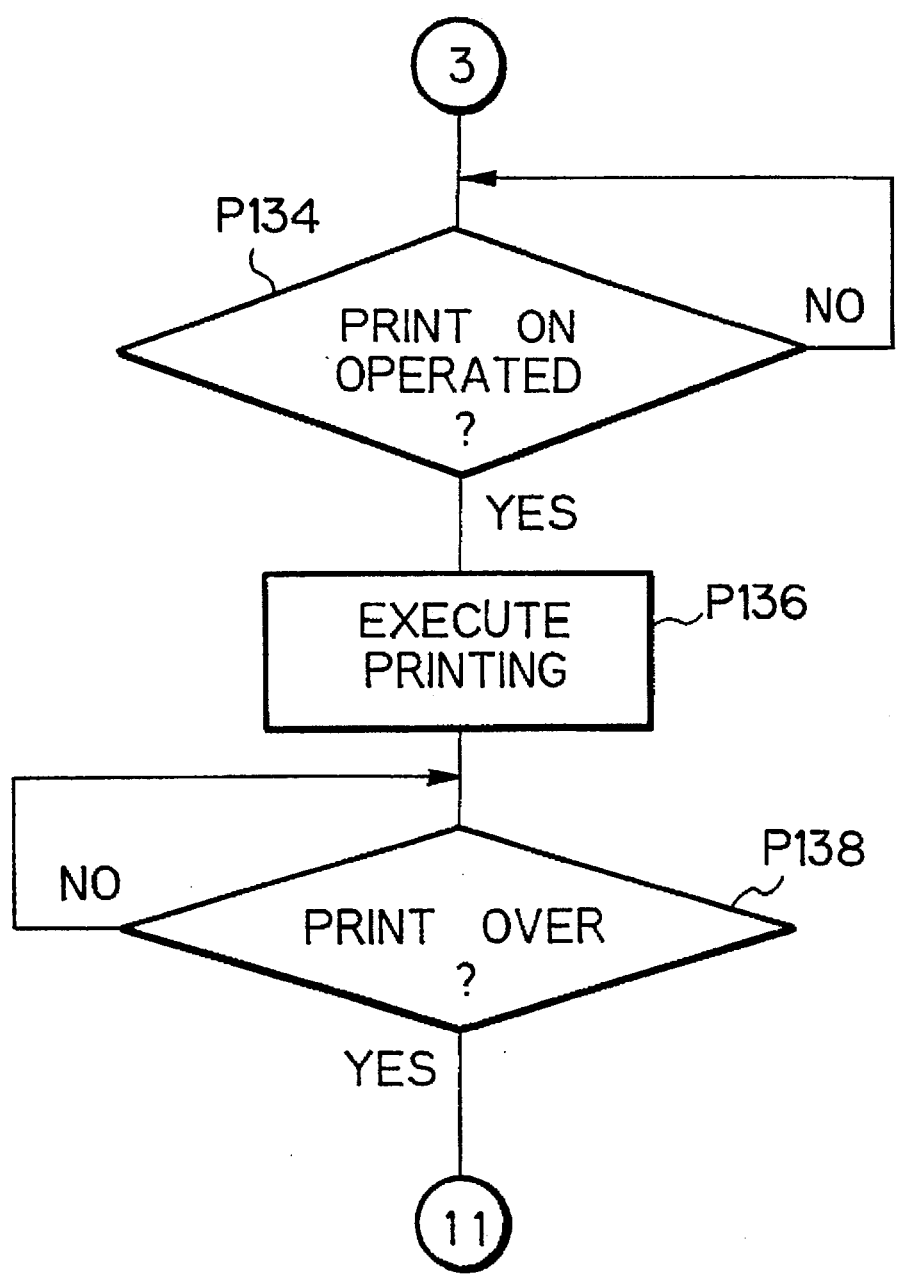
Figure 10:
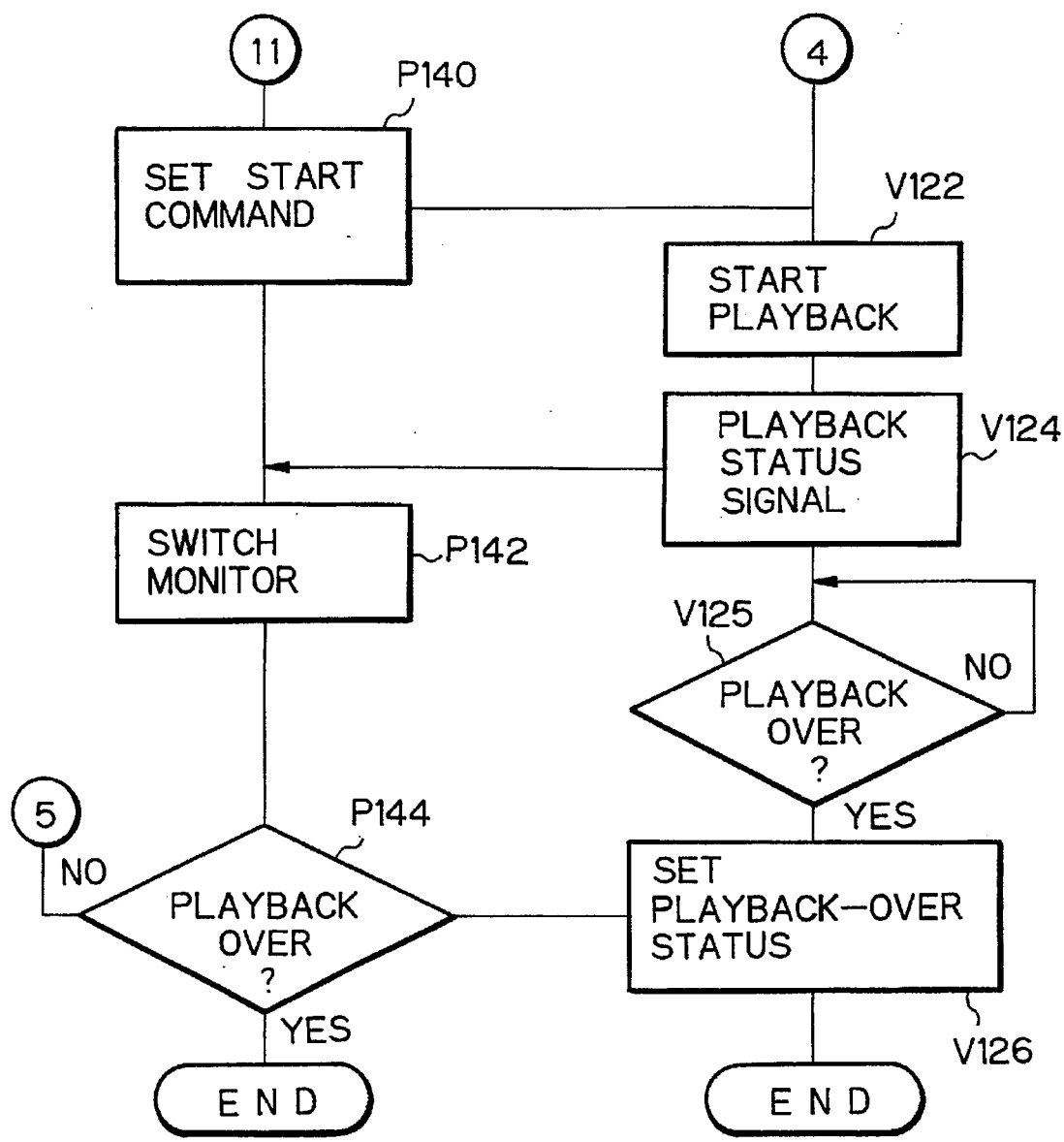

In step P134, FIG. 9, when the operator depresses the print button 100 and the system control 190 detects the depression of the print button 100, the system control 190 sends out the print instruction signal to the memory control 170, the signal processing unit 140 and the printer control 180. In turn, in step P136, the printing operations in steps P124–P130 are sequentially performed with respect to a plurality of frames of image received in the memory 110. In step P138, upon detection of termination of the printing, the system control 190 builds, in step P140, the playback start command and transmits the same to the camera recorder 20. Thus, in the camera recorder 20, in step V122, the playback of the tape is again started. Similarly to the matter mentioned above, in step V124, the playback status signal is transmitted to the system control 190 of the printer 10. Upon receipt of the playback status signal, in step P142, the system control 190 switches the selector 160 to select the reproduced signal from the camera recorder 20 and display the same on the monitor apparatus 30.

In the camera recorder 20, in step V125, it is determined whether or not the tape playback is over. When it is determined that the playback is completed, in step V126, a signal representing the playback-over status is transmitted to the system control 190 of the printer 10. The system control 190 repeats the operation from step P106 in FIG. 5 to step P144 in FIG. 7 until being notified of the playback-over status. The system control 190 terminates the processing when informed of the playback-over status from the camera recorder 20.

Now, the embodiment described above is not adapted to allow repeated depressions of the freeze button 90 to cause a corresponding plurality of frames of image to be displayed. The system may however be designed to include a image scroll key, operation of which causes a plurality of frames of image stored in the memory to be sequentially displayed on the monitor screen, on which the operator may confirm the images he or she desires. Further, the embodiment described above is adapted to detect the status signal derived from the camera recorder 20 and then generate the control signal. However, the system may be designed to transmit the stop signal only in response to the storage completion of the picture signal into the memory 110.

Further, the video printer may be so designed that before transferring a command to the camera recorder 20, it studies the state of the camera recorder 20, and if it detects the recorder 20 in its normal state, then it transmits that command to the recorder. This modified embodiment will be described referring to the flow chart shown in FIG. 11. For example, when a connector cable is not coupled to the camera recorder 20, or communication was unsuccessful with the camera recorder 20, the video printer 10 performs the error processing and processings following the former.

Figure 11:
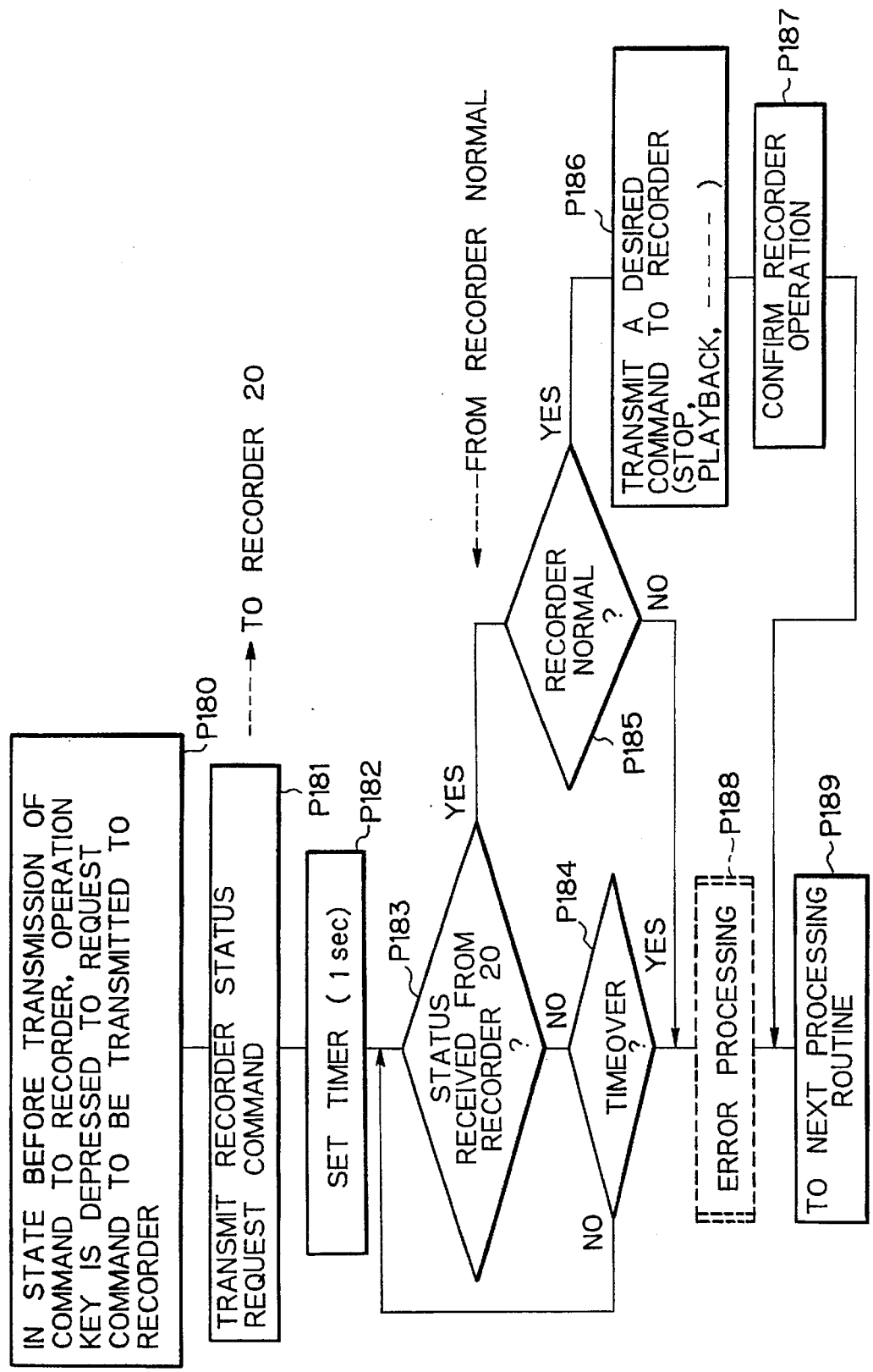
FIG. 11 shows a control flow of the illustrative embodiment of the camera recorder in the case where the state of the camera recorder is detected and the detected state is normal.

Referring to FIG. 11, in step P180, the printer control 180 is in the state before transmitting a command, and receives a request of transmitting a command to the camera recorder 20 by depressing the operation key or the like of the printer 10, the printer control 180 transmits to the camera recorder 20 a command requesting the status of the camera recorder 20, step P181. In step P182, a timer, not shown, defining a period of time, within which a response should be received from the camera recorder 20, is set to start timing. In step P183, it is determined whether or not the status information is received before the time over (step P184) from the camera recorder 20. In step P185, it is determined whether or not the camera recorder 20 is in its normal state. If it is normal, in step P186, the print control 180 transmits to the camera recorder 20 an appropriate command, such as a command to control recording, playback, stop or pause, or to instruct preparing operation therefor, such as rewinding or feeding forward.

In step P184, when the timer becomes timed out without reseiving any response from the camera recorder 20, this means that the camera recorder 20 is in its abnormal state. For example, the camera recorder 20 may not be connected to the printer 10, or may not be powered on. Then the process goes to step P188 in which the error processing is executed, and then to step P189 for the subsequent processing routine. Also in step P185, if the response status from the camera recorder 20 indicates the abnormality of the camera recorder 20, then the process goes to step P188 for the error processing.

Figure 12:
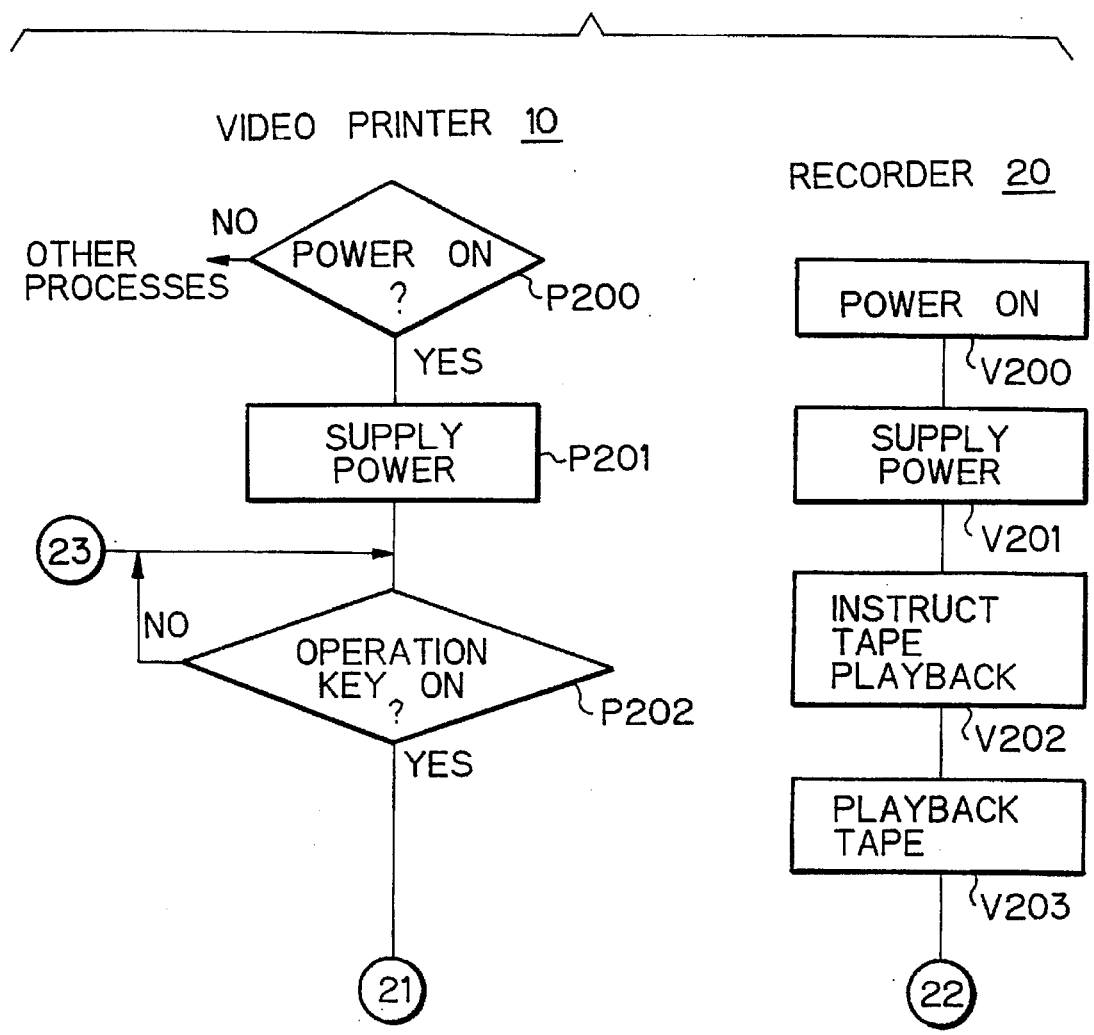
FIGS. 12 and 13 are a flow chart useful for understanding of a control operation of the embodiment of the video printer and the camera recorder in the case where the camera recorder is stopped in operation in response to a freeze key operation of the printer, so that the operation of the camera recorder is simplified.
Figure 13:
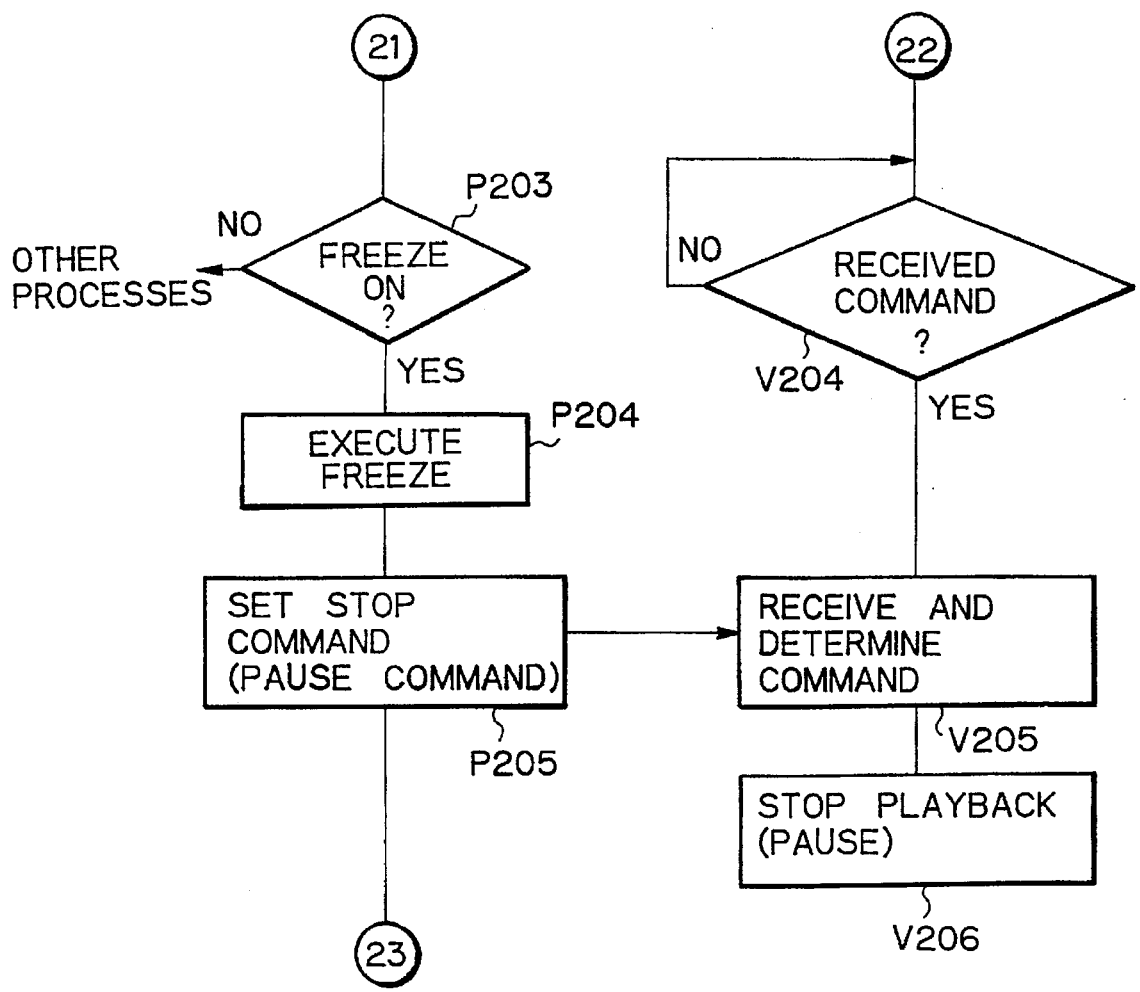

Referring now to FIGS. 12 and 13, there will be described another embodiment in which the operation of the camera recorder 20 is simplified. In the control flow, an operation of the camera recorder 20 is stopped in response to the freezing operation of the printer 10. First, in step P200, the power switch of the printer 10 is turned on. In step P201, an initialization processing is carried out. In step P202, the state of the operation key is sensed. According to this embodiment, when any of the keys provided on the printer 10, including the freeze key 90 or the print key 100, is depressed, steps P202 and P203, freezing of the image or storage of the image data in the memory 110 is performed, respectively. Thus, in step P205, the printer control 180 sets up a command to stop the camera recorder 20, such as the stop command or the pause command, and transmits this command to the camera recorder 20.

On the other hand, in the camera recorder 20, in step V200, a power switch of the camera recorder 20 is turned on. In step V201, an initialization processing is carried out. In step V202, tape playback is instructed. In step V203, a tape is played back. Under this condition, the camera recorder 20 is in its standby mode in which recorder 20 is ready to receive the command from the printer 10, step V204, FIG. 13. Upon receipt of the stop command or the pause command from the printer 10, the camera recorder 20 decodes the command, step V205, and stops or temporarily halts the playback operation, step V206. While, in the printer 10, after transmitting the command, the process goes to step P202 in the standby state, waiting for a key operation.

As described above, the instant embodiment of the printer 10 is adapted to be responsive to a manipulation of any of the keys to perform the control of recording, playback or stop operation of the camera recorder 20. Alternatively, the printer may be designed to perform, in responsive to a manipulation of any key, operations for preparing the recording, playback or stop operations of the camera recorder 20, such as a rewinding operation. Further, although the camera recorder 20 may be adapted to be controlled in response to an operation of any key as describe above, it may alternatively be designed to be controlled in response to an operation of a specified key only.

Figure 14:
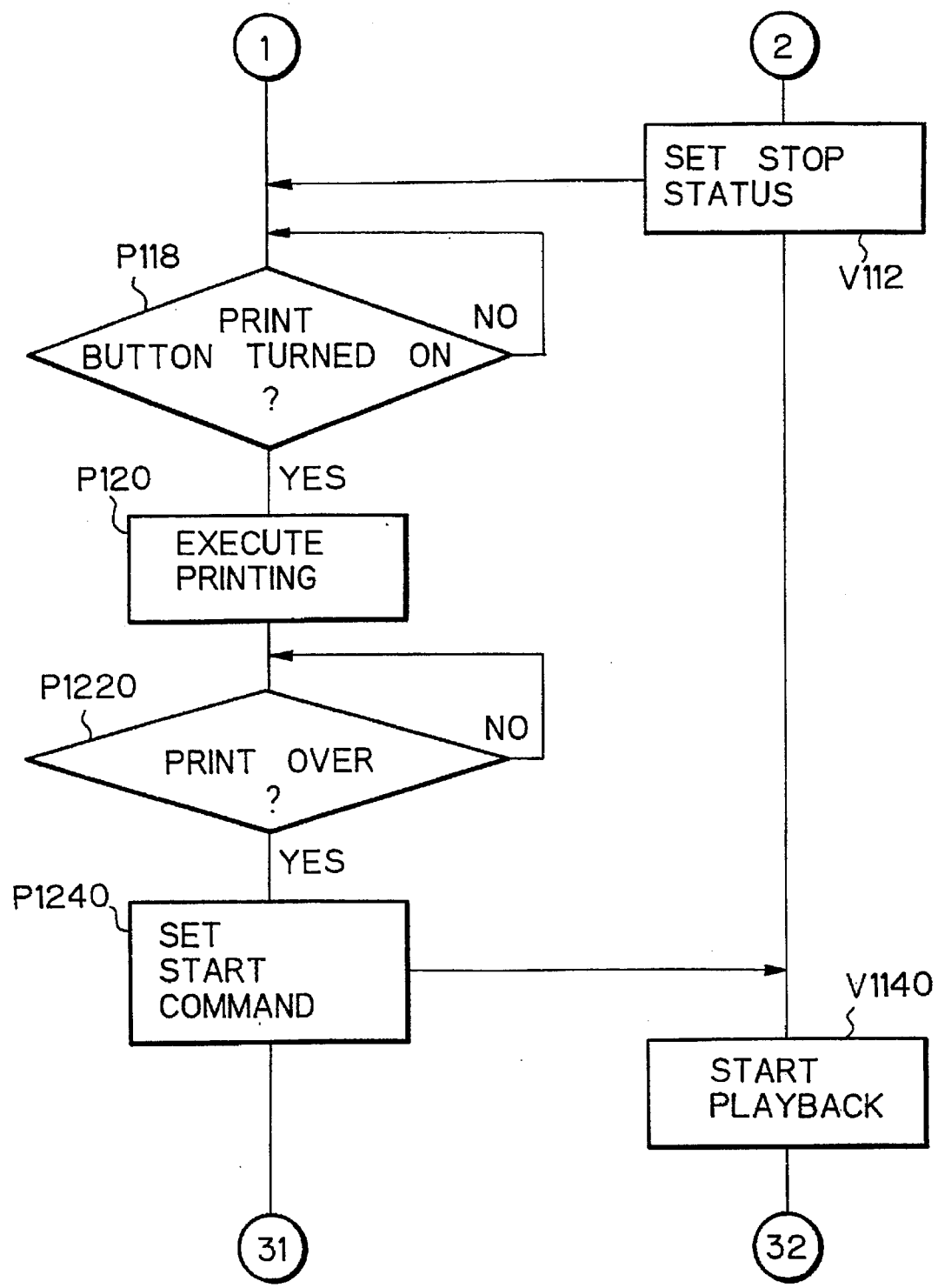
FIGS. 14 and 15 are a flow chart useful for understanding the operation of the video printer and the camera recorder into which operation the operation shown in FIGS. 7-10 is modified.

Furthermore, according to the present embodiment, while the printing fashion has been described referring to the flow chart shown in FIGS. 7 and 8, it is acceptable to modify that embodiment in respect of the control following the printing control described with reference to FIGS. 7 and 8. FIGS. 14 and 15 show a control flow executed in the modified embodiment, which will be described hereinafter.

Figure 7:
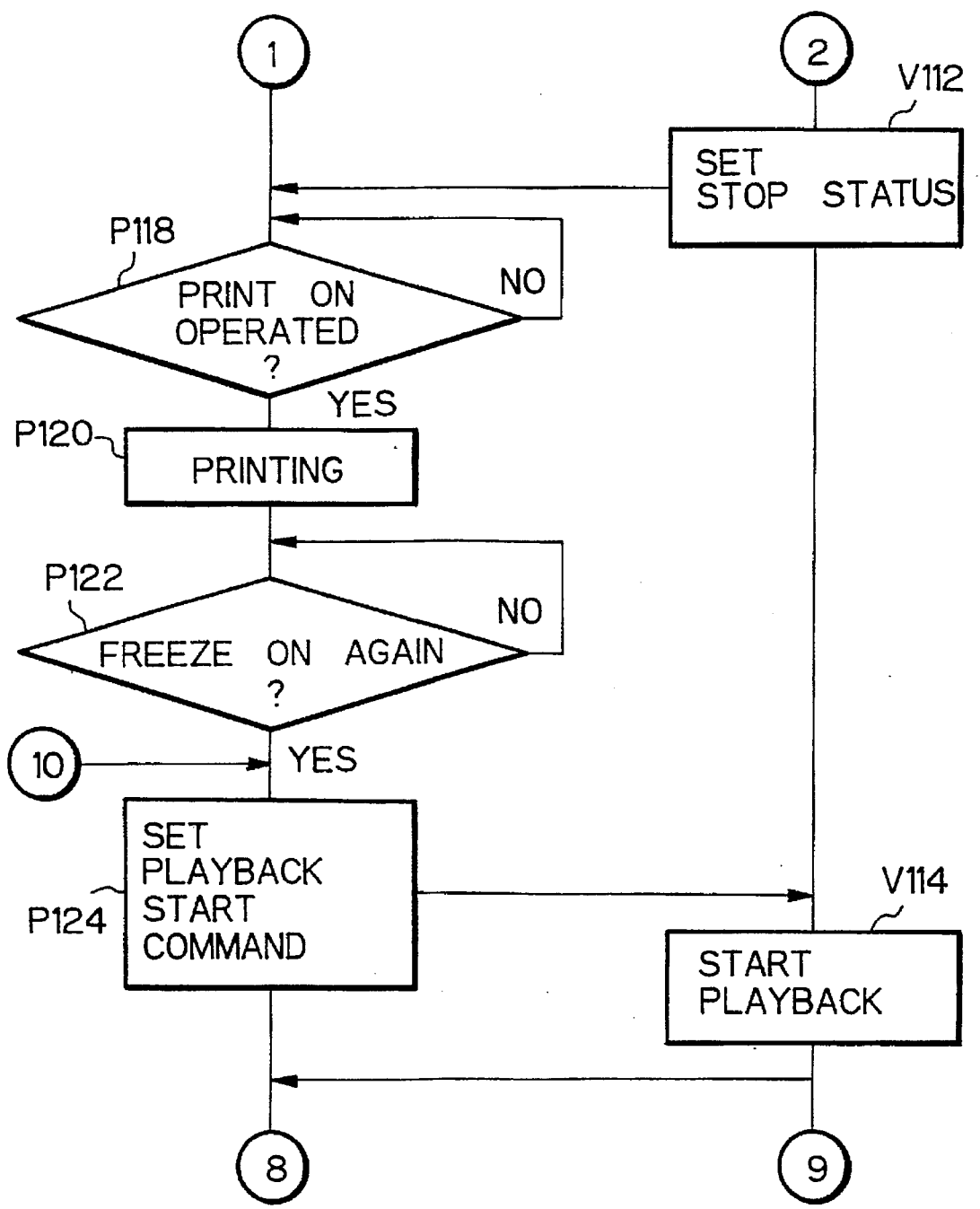
Figure 8:
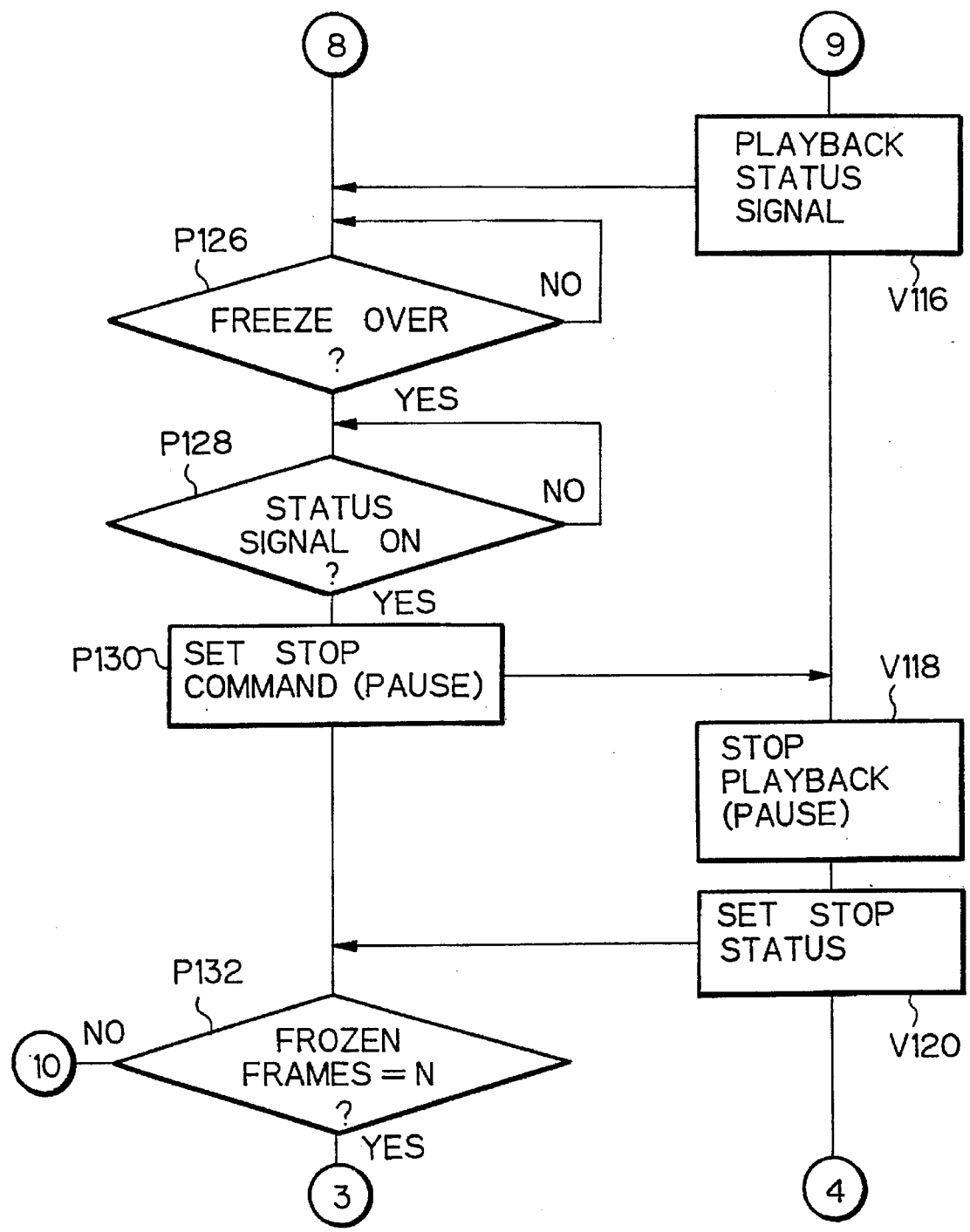
Figure 15:
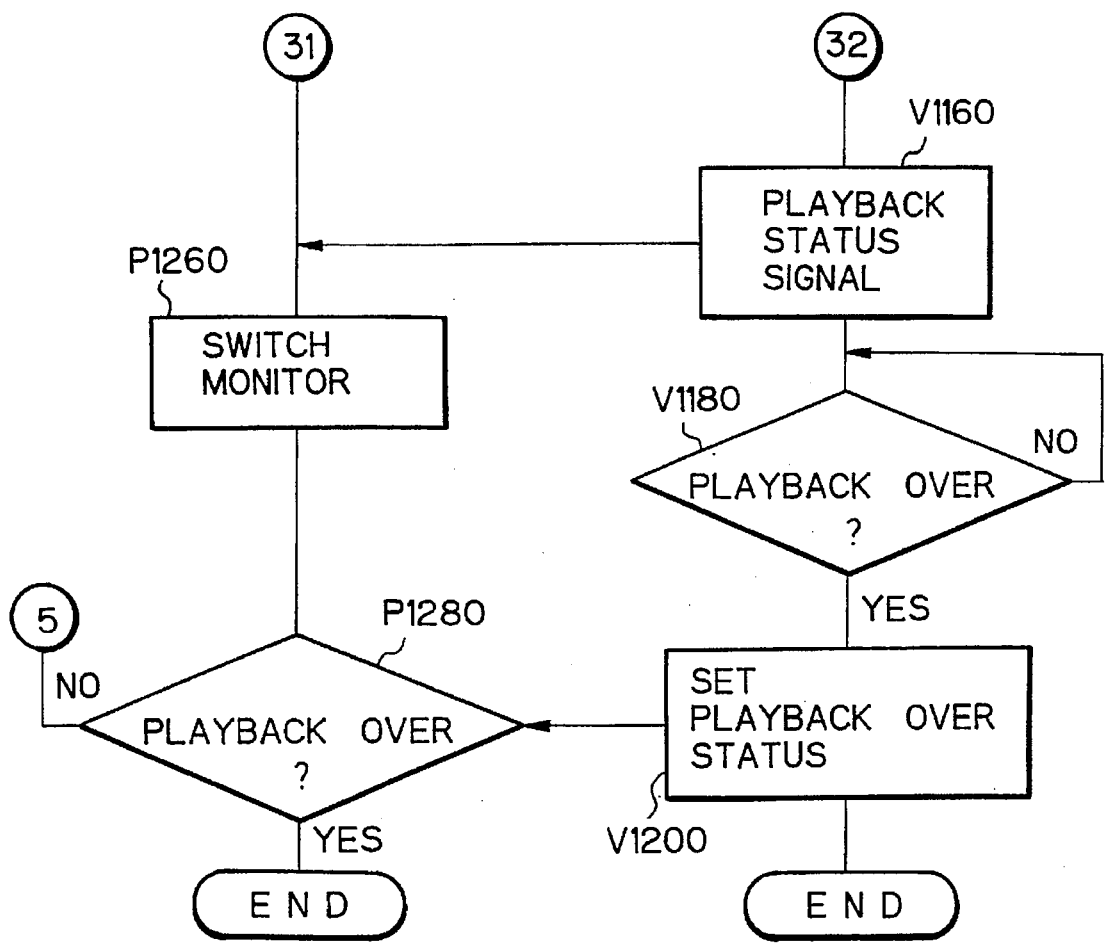

In FIGS. 14 and 15, the like parts are denoted by the same reference numbers as those of FIGS. 7 and 8, and a redundant description on those parts will be omitted. Referring to FIGS. 14 and 15, when the printing is terminated, the printer control 180 transmits a print-over signal to the system control 190. Upon receipt of the print-over signal, in step P1220, the system control 190 detects the termination of the printing, and in step 1240 makes up a playback start command and transmits the same to the camera recorder 20. Thus, in the camera recorder 20, in step V1140, the playback of the tape is again started. Similarly to the matter mentioned above, in step V1160, FIG. 15, the playback status signal is transmitted to the system control 190 of the printer 10. Upon receipt of the playback status signal, in step P1260, the system control 190 switches the selector 160 to select the reproduced signal from the camera recorder 20 and display the same on the monitor apparatus 30. This causes the images subsequent to the printed image to be reproduced on the monitor screen in a movie fashion.

In the camera recorder 20, in step V1180, FIG. 15, it is determined whether or not the tape playback is over. When it is determined that the playback is over, in step V1200, the playback-over status signal is transmitted to the system control 190 of the printer 10. The system control 190 repeats the operations from step P106 in FIG. 5 to step P1260 in FIG. 15 until receiving the playback-over status signal again. The system control 190 terminates the processings when received the playback-over status signal from the camera recorder 20.

The present embodiment is so arranged that upon receipt of the print-over signal from the print control 180, the system control 190 transmits the playback command to the camera recorder 20. However, the printer 10 may be adapted to transmit the playback command to the camera recorder 20 when the print button is depressed. Further, according to the present embodiment, the control signal is supplied from the system control 190 over the control line 50 to the camera recorder 20. The printer 10 may, however, be adapted to transmit such control signals on a wireless basis. Further, it is acceptable to arrange the system in such a manner that the freeze button or the signal fetching button is provided on a box separate from the casing in which the printer mechanism or circuit is accommodated, and is adapted to transmit signals in response to the key operations to the system control on a wireless basis.

Figure 16:
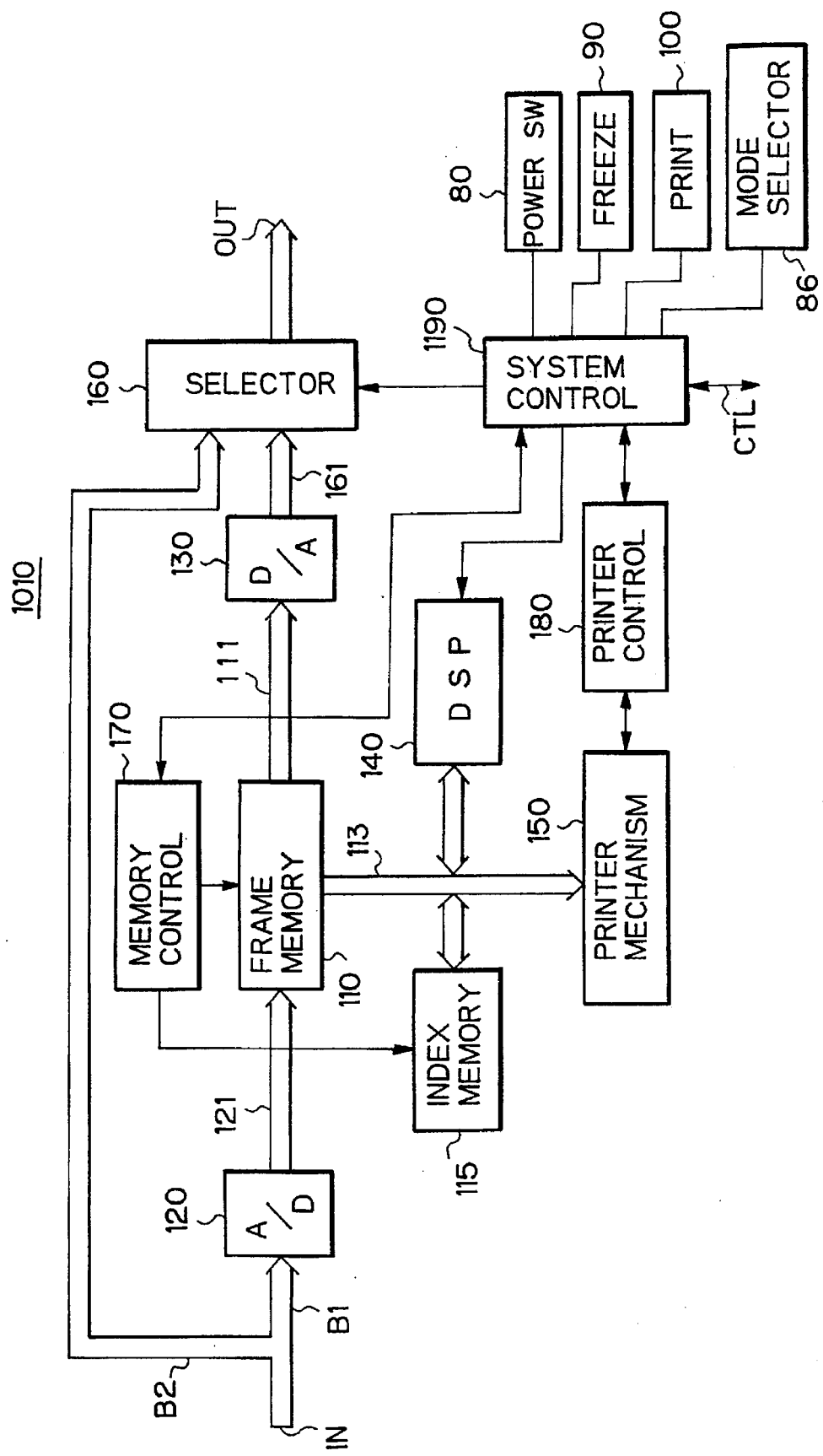
FIG. 16 is a schematic block diagram, similar to FIG. 1, showing another illustrative embodiment of a video printer according to the present invention.
Figure 17:
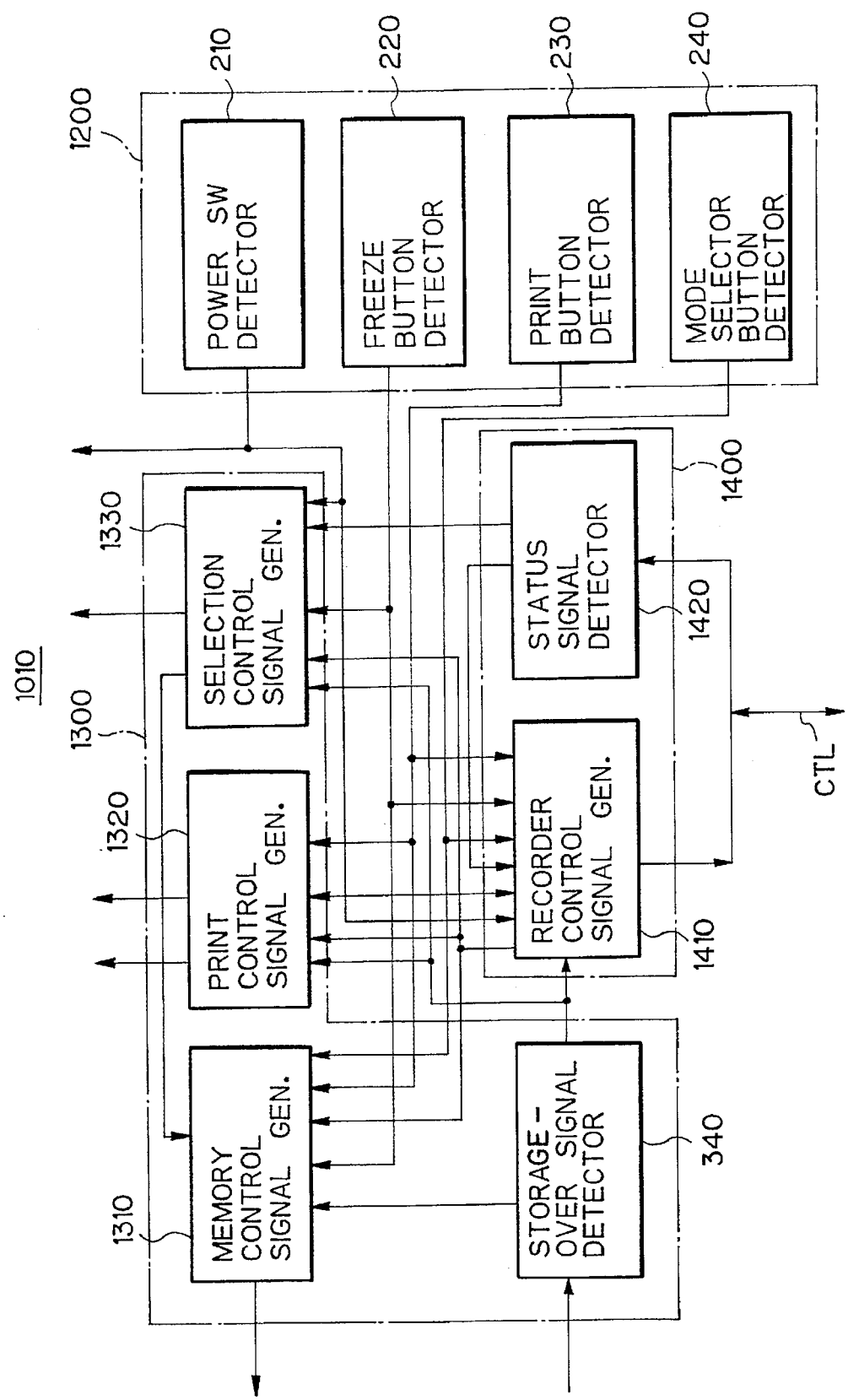
FIG. 17 is a functional block diagram, similar to FIG. 2, of the system control of the video printer shown in FIG. 16.
Figure 18:
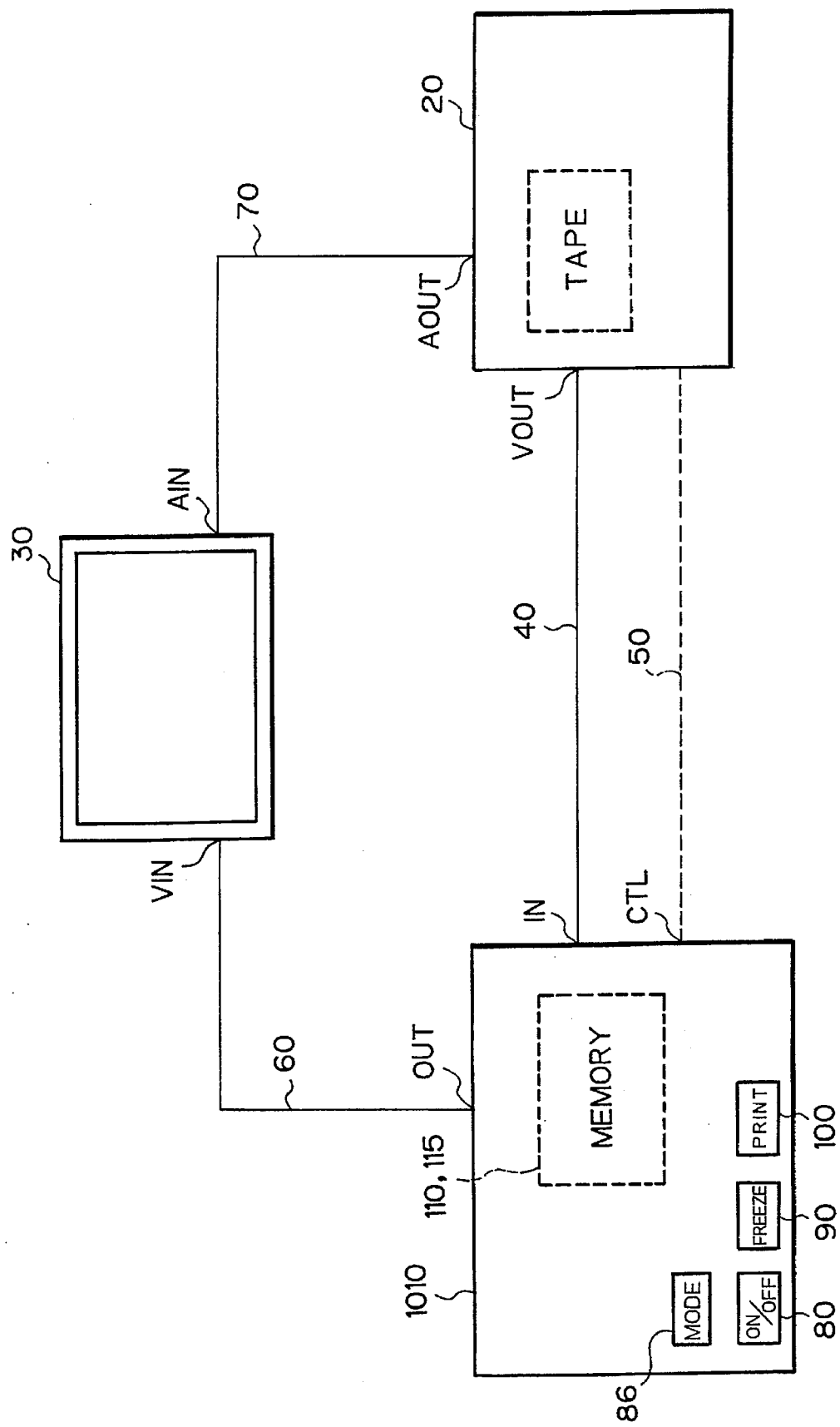
FIG. 18 is a schematic block diagram, similar to FIG. 3, showing the other embodiment interconnected to other devices according to the present invention.

Next, referring to FIGS. 16–23, an alternative embodiment of the video printer of the present invention will be described. In the following figures, the like parts are designated by the same reference numbers as those of FIGS. 1–3, and the redundant description on those will be omitted. Referring to FIG. 18, the video printer 1010 has been replaced for the video printer 10 shown in FIG. 3.

The video printer 1010 according to the embodiment is provided with a mode selector key or button 86 in addition to the keys such as the power switch 80, freeze button 90 and print button 100, which are already described with reference to FIG. 3. The mode selector button 86 is for optionally selecting a regular mode and an automatic indexing mode. In the regular mode, one frame of image is printed on one print sheet in response to a depression of the freeze button 90 and the print button 100. In the automatic indexing mode, according to the present embodiment, in the case of 90 minute-video tape, for example, 16 different frames of picture signal are sequentially received at the interval of 5 minutes to be reduced in size to form a single, full sized frame of image to be printed on a single sheet of print. This is called an index print or multiple image print. These picture signals are stored in the frame memory 110.

Next, the internal structure of the video printer 1010 will be described referring to FIGS. 16 and 17. In FIGS. 16 and 17, since the like parts are denoted by the same reference numbers as those of FIGS. 1 and 2 and the corresponding description of those have been made with reference to FIGS. 1 and 2, only particular portions of the instant embodiment will be describe.

Specifically, in the illustrative embodiment, the signal processing circuit 140 practices, in the indexing mode, a thinning processing on data derived from the frame memory 110 to form an image reduced in size to one-sixteenth of the original image, for example, and transfers the same to an index memory 115. The index memory 115 is constituted, similar to the frame memory 110, of a video RAM or a like rewritable storage device, and has a storage capacity capable of storing at least one frame of image data in the form of picture signals. The signal processing circuit (DSP) 140 serves, in the indexing mode and the regular mode, to convert, for example, Y-C data in the form of a television signal, which comprises a luminance signal (Y) and a chrominance signal (C) from the memories 110 and 115, into data for use in printing of yellow (Ye), magenta (M), cyan (Cy) and black (K), and then transfer the latter to the printer mechanism 150. The printer mechanism 150 prints an image based on the data derived from the digital signal processor 140.

The video printer 1010 includes the selector 160, which is switched in response to a control signal derived from a system control 1190. The system control 1190 is adapted to send out a control signal, when any of the buttons 80, 90, 100 and 86 is depressed, to the appropriate sections or units in the printer 1010. Specifically, in the indexing mode, when the freeze button 90 is depressed, the system control 1190 sends out control signals instructing playback and feed forward operations to the camera recorder 20, and also monitors the states of the elements contained in the printer 1010. In addition, the system control 1190 is also adapted to instruct the memory control 170 to receive the first to sixteenth full-sized frames of picture signal, and the signal processing circuit 140 to reduce those full-sized frames and form data representative of an index image constituting those sixteen reduced images in the memory 115. Thereafter, the system control 1190 controls the printer control 180 to print the index image.

In detail, as shown in FIG. 17, the system control 1190 includes a button depression detecting section 1200, an internal control signal processing section 1300 and a camera recorder control signal processing section 1400. The button depression detecting section 1200 is adapted for detecting a depression of the buttons 80, 90, 100 and 86, and for informing the appropriate control signal processing sections 1300 and 1400 of button depressions. According to the embodiment, the button depression detecting section 1200 has a mode selector button depression detector 240 in addition to other key depression detectors such as the power switch depression detector 21. The internal control signal processing section 1300 serves to transmit control signals instructing the processings to the controllers 180 and 170, and the signal processing circuit 140, and also receive counter control signals from the associated controllers, so that those controllers and processing circuit can sequentially perform the appropriate processings. Further, the internal control signal processing section 1300 also serves to transmit a control signal to switch the output thereof to the selector 160. The internal control signal processing section 1300 comprises, for example, a memory control signal generator 1310, a print control signal generator 1320, a selection control signal generator 1330 and the storage-over signal detector 340. The camera recorder control signal processing section 1400 is adapted for monitoring the status of the camera recorder 20, and for generating and transmitting a control signal to control the camera recorder 20 on the control line 50. The camera recorder control signal processing section 1400 comprises a camera recorder control signal generator 1410 and a status signal detector 1420.

To describe the functions of the sections of the printer 1010, first, in the button depression detecting section 1200, the mode selector button depression detector 240 serves to detect a depression of the mode selector button 86 to select either the regular mode or the indexing mode and send out a mode signal to the memory control signal generator 1310 and the camera recorder control signal generator 1410.

In the internal control signal processing section 1300, the memory control signal generator 1310 functions as supplying the memory control 170 with a control signal instructing loading the memory 110 with a signal and reading out the signal therefrom. Specifically, in the regular mode, upon receipt of the freeze signal from the freeze button depression detector 220 during the camera recorder 20 playing a tape back, or upon receipt of the playback start signal from the camera recorder control signal generator 1410 in the stop state, the memory control signal generator 1310 transmits a signal storage signal to the memory control 170. Further, upon receipt of the print signal from the print button depression detector 230 after completing storage of the signal into the memory 110, or upon receipt of the control signal, from the selection control signal generator 1330, to instruct selecting a signal from the memory 110, the memory control signal generator 1310 transmits a control signal to instruct read out of the signal to the memory control 170.

In the indexing mode, the memory control signal generator 1310 is responsive to a timing signal from the camera recorder control signal generator 1410, after received the freeze signal from the freeze button depression detector 220, to transmit to the memory control 170 a storage instruction signal instructing the memory 110 to store the signals. The memory control signal generator 1310 further generates instructions to provide such a control that, after completing storage of the signals into the memory 110, the signals from the memory 110 are read out on the signal processing circuit 140, and the data representing reduced images processed are written into the memory 115. In addition, the memory control signal generator 1310 generates instructions to read out the signals from the memory 115 to the printer after forming the index image.

The print control signal generator 1320 serves as sending out a control signal to instruct printing to the signal processing circuit 140 and the printer control 180. Specifically, in the regular mode, upon receipt of the print signal from the print button depression detector 230 in the state in which the picture signal is stored in the memory 110, the print control signal generator 1320 transmits a print instruction signal to the signal processing circuit 140 and the printer control 180, and when the printing is terminated, delivers a print-over signal to the camera recorder control signal generator 1410. In the indexing mode, the print control signal generator 1320 is responsive to the timing signal from the camera recorder control signal generator 1410 to instruct the signal processing circuit 140 to reduce the image derived from the memory 110. Additionally, when data of the index image is formed in the memory 115, the print control signal generator 1320 is responsive to the timing signal from the camera recorder control signal generator 1410 to instruct the signal processing circuit 140 and the printer control 180 to perform printing.

The selector control signal generator 1330 is adapted to send out a switching signal to switch the selector 170. Specifically, in the indexing mode, upon receipt of the freeze signal from the freeze button depression detector 220 and a storage-over signal from the storage-over signal detector 340, the selector control signal generator 330 provides the selector 160 with the selection signal to switch the image selection mode from selecting the signal involved in a movie image from the second bus B2 to selecting a still image from the memory 110 via the digital-to-analog converter 130. Thereafter, upon receipt of the timing signal from the camera recorder control signal generator 1410, the selector control signal generator 1330 develops again the selection signal to select the picture signal over the second bus B2 to the selector 160. In the case of selecting data of a still image from the memory 110, the selection control signal generator 1330 supplies the memory control signal generator 1310 with a read instruction signal to read out the signals from the memory 110.

In the camera recorder control signal processing section 1400, the camera recorder control signal generator 1410 serves as generating and sending out a control signal controlling the camera recorder 20 over the control line 50. Specifically, in the indexing mode, upon receipt of the freeze signal from the freeze button depression detector 220, the camera recorder control signal generator 1410 transmits a timing signal to instruct storing a first frame of picture signal to the memory control signal generator 1310. Further, upon receipt of the storage-over signal from the storage-over signal detector 340, the camera recorder control signal generator 1410 transmits a timing signal to form a reduced frame of the first picture signal to the print control signal generator 1320, and also a control signal to instruct feeding a tape forward to the camera recorder 20. Following periodical receipts of the detection signal from the status signal detector 1420 cause the camera recorder control signal generator 1410 to instruct the camera recorder 20 to playback, and transmit the timing signals mentioned above to the memory control signal generator 1310 and the print control signal generator 1320, so as to cause the camera recorder 20 to repeatedly perform the feed forward and playback operations to develop 16 frames of full-sized image signals, in the instant embodiment, and reduce those frames to be combined into a single, index frame. In the regular mode, upon detecting the freeze button 90, the camera recorder control signal generator 1410 instructs the camera recorder 20 to stop the playback operation when the storage of the full frame of image signals into the memory 110 is finnished. Further, when the print is completed following the depression of the print button 100, the camera recorder control signal generator 1410 generates a control signal to instruct the camera recorder 20 to start the playback operation.

The status signal detector 1420 is adapted to be responsive to the status signal supplied from the camera recorder 20 on the control line 50 for sending out the detection signal to the camera recorder control signal generator 1410 and the selection control signal generator 1330. The status signal from the camera recorder 20 has been described in detail with reference to FIG. 4. Specifically in the instant embodiment, the status signal detector 1420 detects the status signal having the time interval corresponding to ⅟30 second per frame, which is synchronous with a vertical sync signal, to count the status signal, and supplies at the time the cout reaches four minutes and fifty-nine seconds the first detection signal to start the playback to the camera recorder control signal generator 1410 to transmit a detection signal to start fetching signals to the camera recorder control signal generator 1410 when five minutes have passed. Thereafter, both of the detection signals are repeatedly supplied to the camera recorder control signal generator 1410 at intervals of four minutes and fifty-nine seconds, and five minutes, respectively.

Next, the operation of the video printer 1010 having the structure mentioned above will be described in conjunction with the cooperative operation of the camera recorder 20 referring to the flow charts of FIGS. 19–22.

Figure 19:
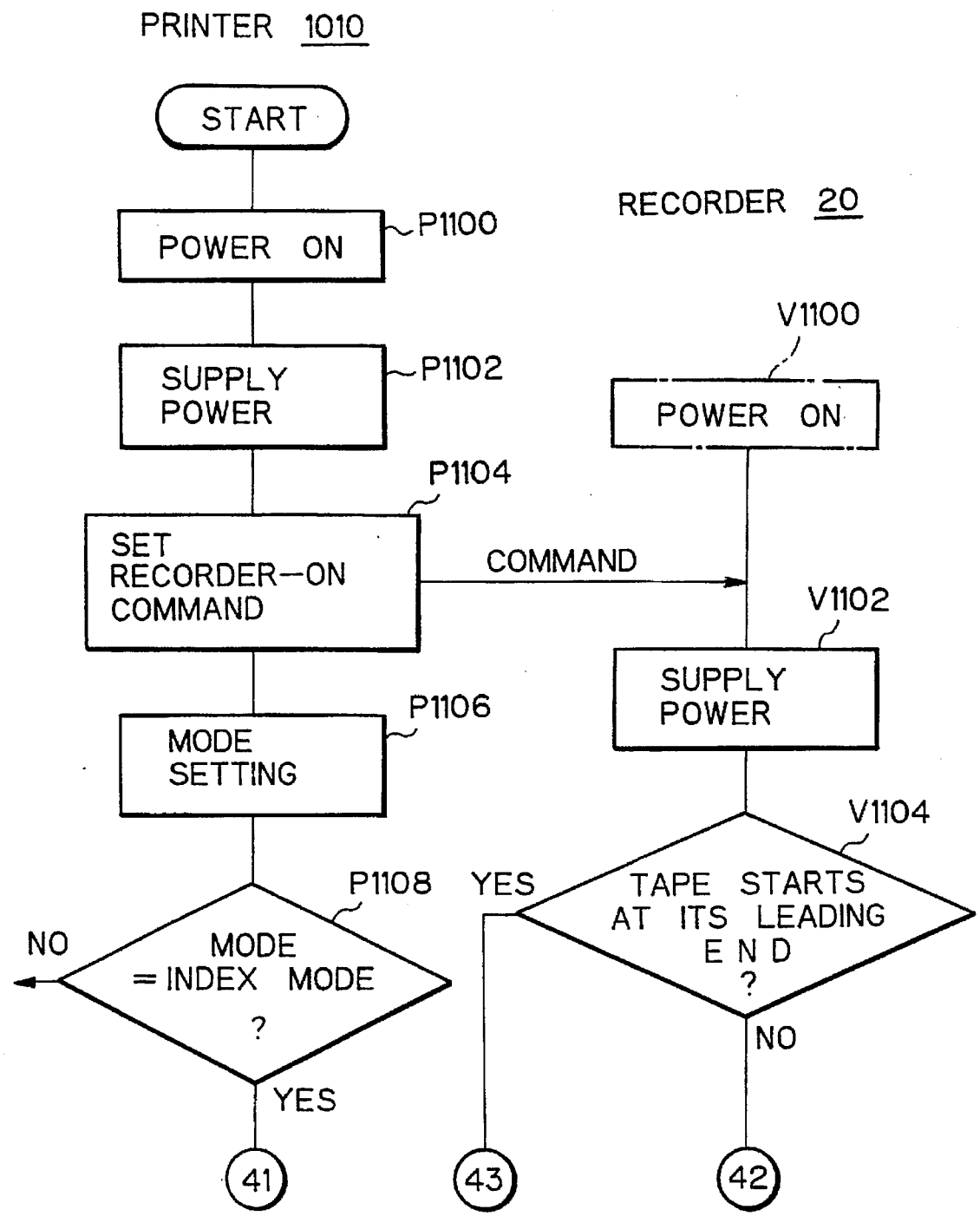
FIGS. 19-22 are a flow chart useful for understanding the operation of the other embodiment shown in FIG. 16.
Figure 20:
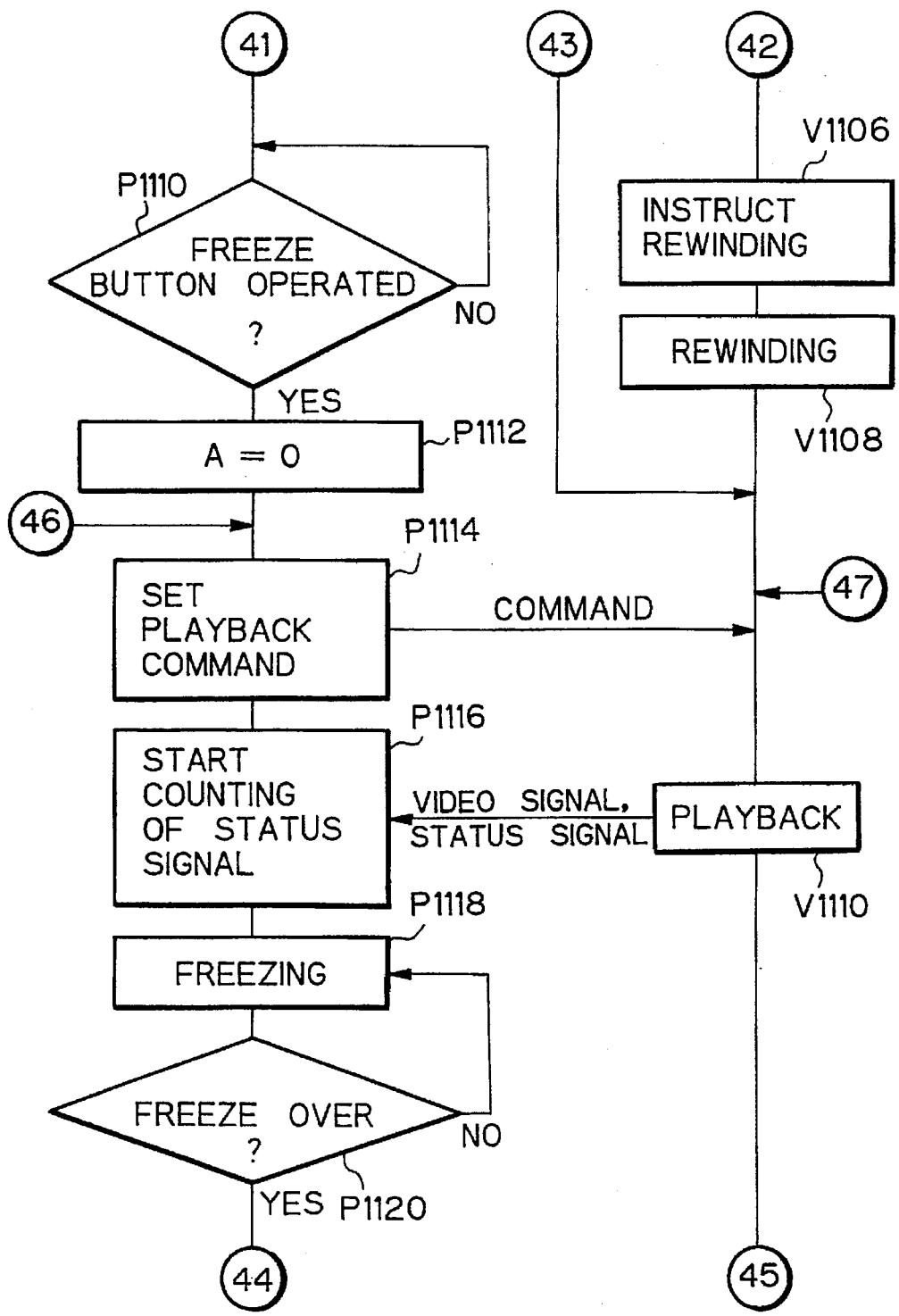

First, referring to FIG. 19, in step V1100, a main power switch, not shown, of the camera recorder 20 is turned on, and in step P1100 involved in the printer 10, the power switch 80 is turned on. In step P1102, the system control 1190 detects the turn-on of the power switch 80 and supplies the electric power to the circuits of the printer 10. In step P1104, the system control 1190 issues a command to turn on the camera recorder 20 and transmits the command to the system control of the camera recorder 20, not shown but similar to that in the printer 1010, over the control line 50, FIG. 18. Thus, in the camera recorder 20 the process goes to step V1102 in which the power is supplied to the appropriate circuitry of the camera recorder 20.

Next, in step P1106 an operator sets the mode selector button 86 to select either the regular mode or the indexing mode. In accordance with the present embodiment, there will be described operations in the indexing mode. In this example, now, the mode selector button 86 is set up to select the indexing mode. On the other hand, in the camera recorder 20, the tape has been rewinded so that the index printing can readyly be performed. In step V1104 the operator confirms whether or not the leading edge of the tape mounted on the camera recorder 20 is at the head position of the recorder 20, and, if not, in step V1106, FIG. 20, a rewinding operation is instructed. Then, in step V1108 the tape is rewound so that the leading edge of the tape is set up to the head position.

In this state, in the printer 1010, the process goes to step P1108, FIG. 19, in which it is determined whether or not the operation mode is the indexing mode. If it is in the indexing mode, the process goes to step P1110, FIG. 20, in which a depression of the freeze button 90 is waited for. When the freeze button 90 is depressed, the system control 1190 detects that, and the process goes to step P1112 in which the number of freeze counts in the indexing mode is reset to "0". Next, in step P1114, the system control 1190 issues the playback command and transmits the same on the control line 50 to the camera recorder 20. Upon receipt of the playback command at the system control of the camera recorder, in step V1110, the camera recorder 20 plays the tape back and supplies the printer 10 with the reproduced image signal and the associated status signal over the first signal line 40 and the control line 50, respectively.

Upon receipt of the image signal and the status signal, in step P1116, the printer 1020 starts counting the status signal having the time interval corresponding to 1/30 second per frame. First, in order that the playback is initiated to receive the first frame of picture signals, the stable reproduction of picture signals causes the process to go to step P1118, in which the system control 1190 transfers the signal-receiving signal to the memory control 170. Thus, the memory control 170 sequentially transmits the writing control signals to the frame memory 110 to write the reproduced signals from the camera recorder 20 to the frame memory 110. When the frame memory 110 stores a frame of picture signals, in step P1120, the memory control 170 generates the storage-over signal to the system control 1190.

Figure 21:
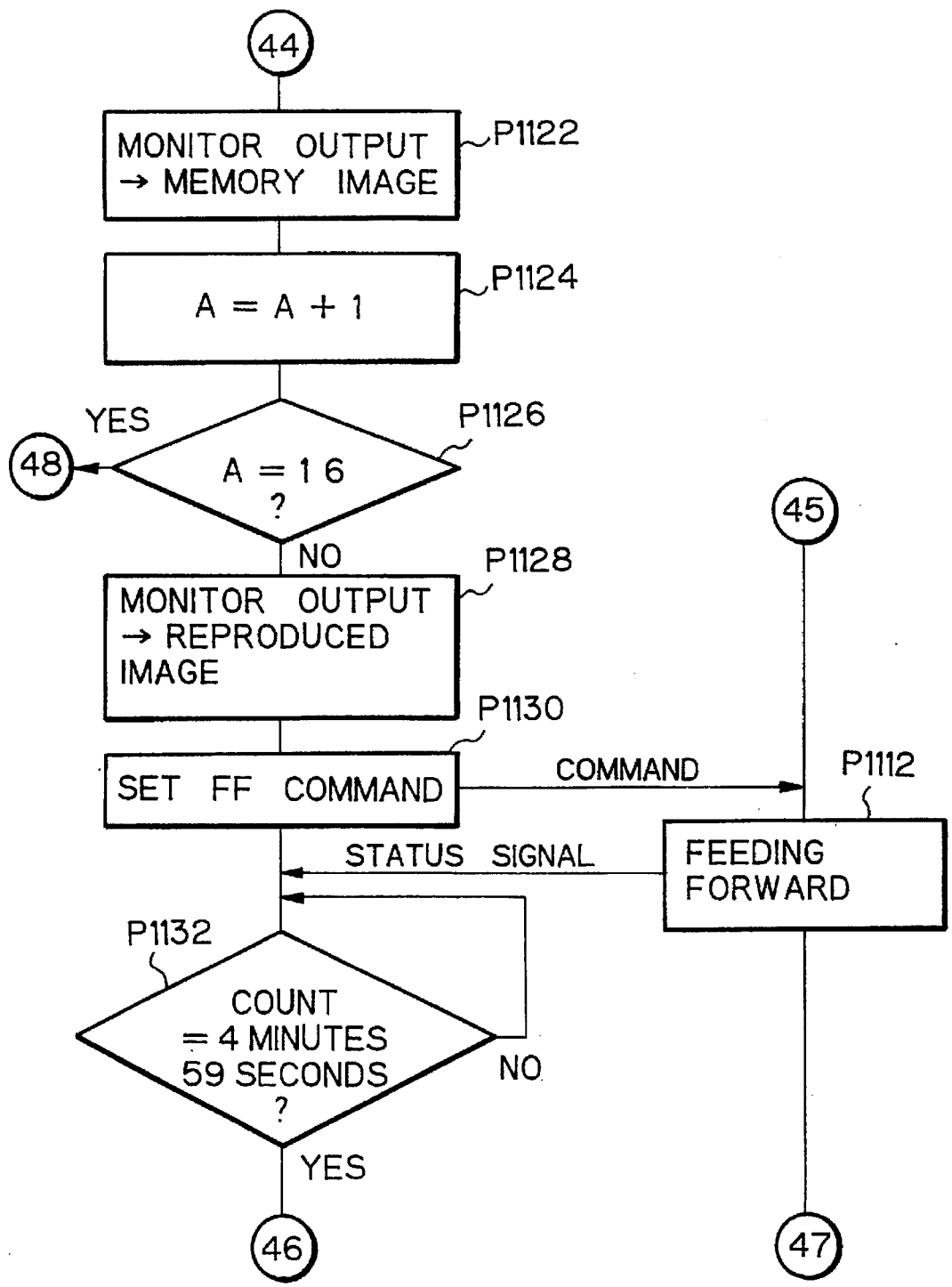

Upon receipt of the storage-over signal, in step P1122 of FIG. 21, the system control 1190 supplies the selector 160 with a frame selection signal, so that the selector 160 switches the reproduced signal obtained from the camera recorder 20 over the second bus B2 to a picture signal of still image read out from the frame memory 110 through the digital-to-analog converter 130. In this manner, the selector 160 conveys the picture signals of the static image from its output OUT port to the video monitor device 30. The monitor device 30 in turn displays an image of the picture signals which were received first into the frame memory 110 of the printer 10. In step P1124, the system control 1190 increments the count of freezings, and in step P1126 determines whether or not the incremented count of freezings becomes "16" (frames). Since this is the first frame in this example, the process goes to step P1128 in which the system control 1190 again generates the frame selection signal to the selector 160, so that the monitor 30 receives the picture signals representative of image in a movie fashion from the camera recorder 20.

In step P1130, the system control 1190 issues a feed forward command, and supplies the same on the control line 50 to the camera recorder 20. Upon receipt of the feed forward command, in step V1112, the camera recorder 20 feeds the tape forward, and in addition transmits the status signal indicating feed forward on the control line 50 to the printer 10. Upon receipt of the status signal, in step P1132, the system control 1190 of the printer 10 counts the status signals until the tape reaches the position corresponding to the playback period of time of 4 minutes and 59 seconds. When the correponding period of time reaches 4 minutes and 59 seconds, the process returns to step P1114 in FIG. 20, the system control 1190 again makes up the playback command and transmits the same to the camera recorder 20. Then, in step V1110, the camera recorder 20 resumes the regular playback mode of the tape at the position corresponding to the time when the 4 minutes and 59 seconds have passed since the playback of the tape started, and supplies the printer 10 with the status signal together with the reproduced signal. The system control 1190 of the printer 10, which now received the status signal, supplies, when the tape reaches the position corresponding to just five minutes, again the memory control 170 with the instruction signal to instruct the frame memory 110 to receive the picture signal. Thus, in step P1118, the second frame of picture signals will be stored in the frame memory 110. When the storage is over, in the similar manner mentioned above, in steps P1122–P1124, switching of the displayed frames and the increment of the count of freezings are performed. Thereafter, until the count of freezings reaches "16", the tape is fed forward every 4 minutes and 59 seconds, and played back every just 5 minutes, so that the fetching of the respective frames of picture signals is repeated.

Figure 22:
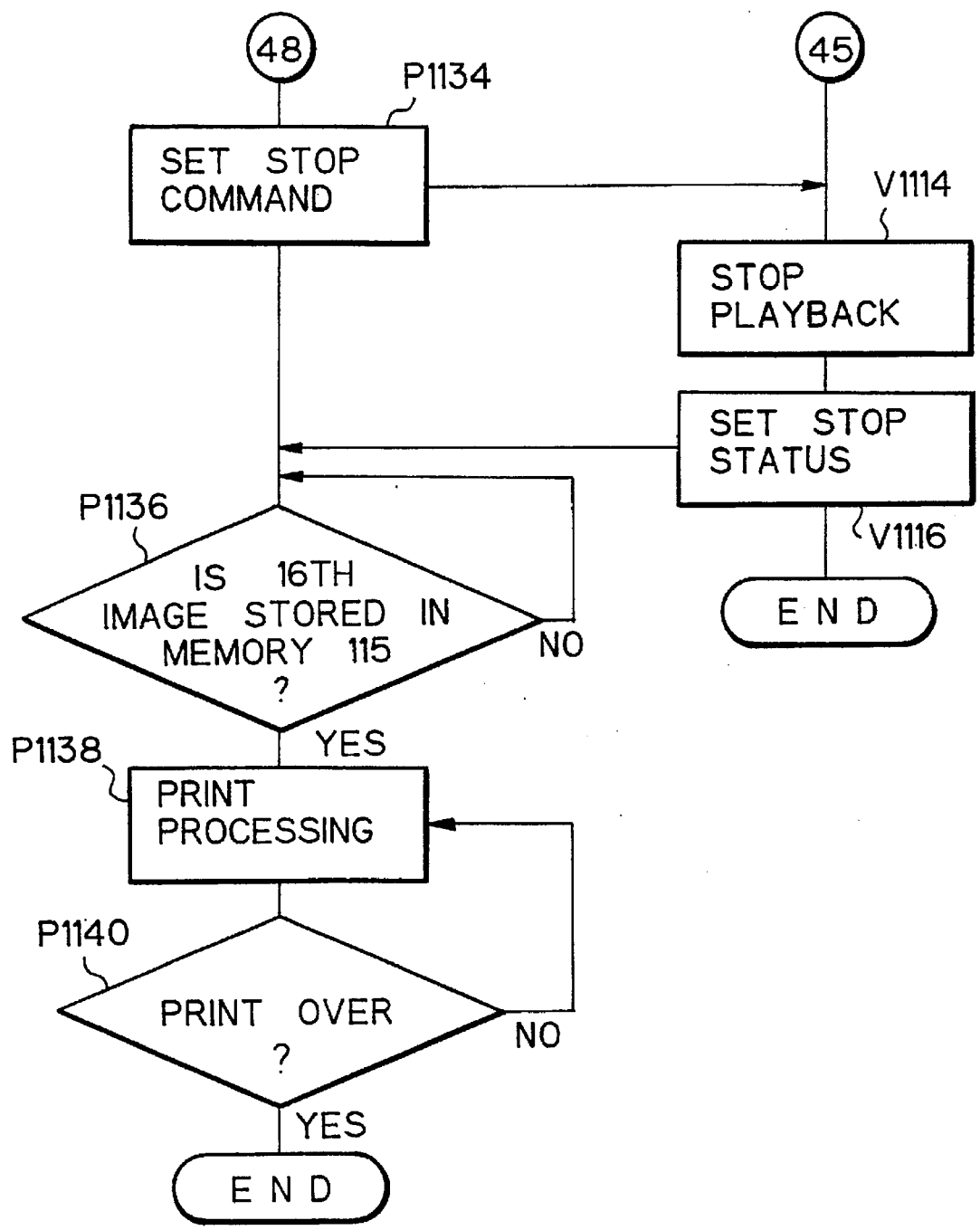

When the predetermined number of frames of picture signals is received and it is in step P1126 confirmed that the sixteenth frame of picture signals has been stored in the frame memory 110, the process goes to step P1134 in FIG. 22, in which the system control 1190 issues a stop command and sends the same out on the control line 50 to the camera recorder 20. Upon receipt of the stop command, in step V1114, the camera recorder 20 stops the playback of the tape, and in step V1116, builds the stop status to transmit the same to the printer 10. On the other hand, the respective frames of picture signals, which have been stored in the frame memory 110 in the above-mentioned fashion, are read out onto the signal processing circuit 140 so as to be subjected to the thinning processing to obtain image data representative of pictures each reduced to the scale of one-sixteenth of the original size. In this manner, the image data are sequentially stored in the index memory 115. In step P1136, when data of the sixteenth reduced image formed by the signal processing circuit 140 is written into the index memory 115, the system control 1190 supplies print instruction signals to the memory control 170, the signal processing circuit 140 and the printer control 180. In response, in step P1138, the picture signals representative of the index image are read out from the index memory 115 so as to be formed into print data, by which the printer mechanism 150 performs printing. Finally, in step P1140, the system control 1190 confirms the completion of printing of the frame of index image, and then terminates the processing in the indexing mode.

Figure 23:
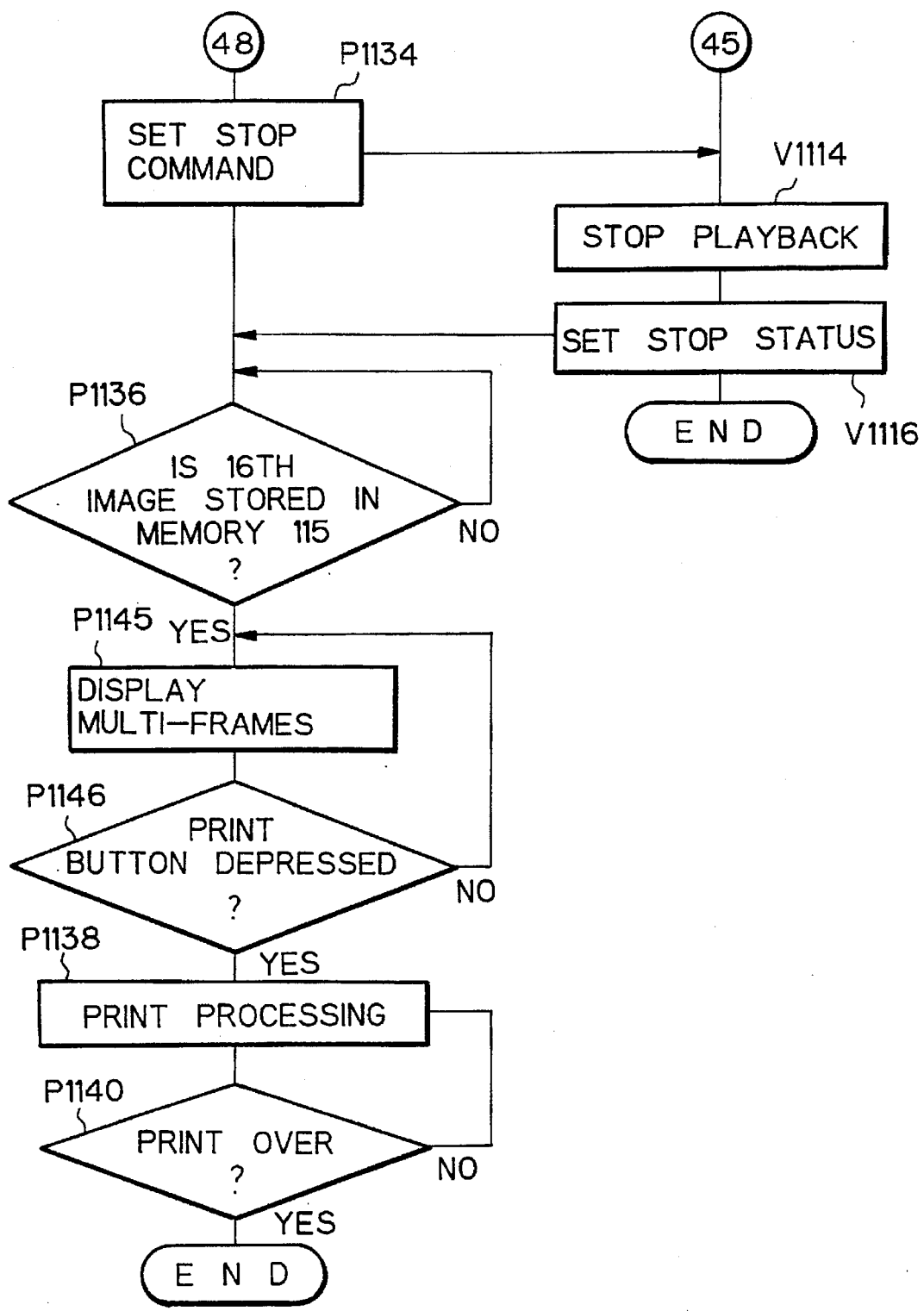
FIG. 23 is a flow chart useful for understanding the operation of the video printer and the camera recorder into which operation the operation shown in FIG. 22.

FIG. 23 shows an alternatrive control flow into which the flow shown in FIG. 22 is modified. Now, referring to the figure, in step P1136, when image data representing the final sixteenth frame of image reduced is received in the memory 115 to form the multiple frame of image, the multiple frame of image is displayed on the video, monitor 30. In this state, when the print button 100 is actuated, step P1146, the print processing P1138 is executed.

The video printer 1010 may be arranged in such a manner that before transferring a command to the camera recorder 20 the state of the camera recorder 20 is determined, and if it is found normal, then a desired command is transferred to the camera recorder 20. This modification is also applicable to the embodiment described above in the same manner as described with reference to FIG. 11 in connection with the first embodiment, and thus the redundant description is omitted.

Further, in the regular mode in the present embodiment, the fetching of image signals and printing of an image are performed on every image in response to depressing the freeze button 90 and the print button 100. In response to depressions of the freeze button 90 and the print button 100, the system control 1190 supplies the camera recorder 20 with the control signal stopping playback and the control signal starting playback, so that the camera recorder 20 stops the playback operation during the period of time beginning at fetching image signals and ending at terminating printing, and upon printing over, automatically resumes playback. Thus, the storing of image signals and printing of the images are performed only in response to the key operations on the printer 10 almost without necessity for manipulating the camera recorder 20. According to the present embodiment, the status signal detector 1420 adopts such a scheme that the signals, which are synchronized with the vertical sync signal, are detected and counted. However, the present invention is not restricted to this scheme, but is also applicable to another scheme such that the subsequent frame to be freezed is selected in response to time information stored in association with a frame of image information or obtained from a time counter of the video tape deck.

According to the video printer of the present embodiment, it is possible to receive image signals and print images only with the buttons operated on the printer 10 without necessity for touching the camera recorder 20. Specifically, in the indexing mode, when the freeze button 90 is depressed, while the mode selection button 86 is set to select the indexing mode, the system control 1190 transmits a control signal to the camera recorder 20, so that in the camera recorder 20 playback and feed forward of a tape are automatically repeated, while 16 frames of picture signals are sequentially stored in the frame memory 110, then sequentially reduced in size and stored in the index memory, and then combined and printed in the form of one frame of image. Consequently, it is possible to cause the index image to be formed and printed by simply operating the freeze button 90 almost once.

According to the embodiment described last, transfer of the signals between the printer 10 and the camera recorder 20 is performed through the first signal line 40 and the control line 50. However, a design may be made to implement the transfer of the signals on a wireless basis using radio waves, infrared or ultrasonic beams, or the like. Further, according to the present embodiment, the indexing mode adopts the particular indexing of 5 minute-interval and 16 frames, it is acceptable, however, to arrange the system so as to optionally set a differeint image signal capturing interval and a different number of frames for indexing.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A video printer connected between a reproducing apparatus for reproducing picture signals representative of images recorded in a movie fashion on a recording medium and a monitor apparatus for receiving picture signals and displaying images based on the received picture signals, wherein, while the picture signals received from said reproducing apparatus are output to said monitor apparatus, a desired frame of image is printed in the form of a still image, said printer comprising:

first storage means for storing therein image data of plural frames of picture signals from said reproducing apparatus;

signal processing means for forming a reduced image from the image data of respective plural frames of picture signals stored in said first storage means;

second storage means for storing therein picture signals representative of the reduced image formed by said signal processing means;

a signal fetching button for causing, when actuated, the picture signals to be stored in said first storage means;

selection and output means for selecting either of the picture signals stored in said storage means and the picture signals reproduced from said reproducing apparatus, and for outputting a selected one of the picture signals to said monitor apparatus; and control means for controlling an operation mode of said video printer between a first mode in which the picture signals are stored in said first storage means whenever said signal fetching button is actuated, and printing is performed on each image, and a second mode in which a plurality of reduced images are formed in the form of a single field of image in response to an operating of said signal fetching button, wherein, in the first mode, when said signal fetching button is actuated to store a field of picture signals in said first storage means, a selection signal is fed to said selection and output means so as to select and output the picture signals stored in said first storage means, while said reproducing apparatus is stopped in a reproducing operation, and in this state, when said signal fetching button is again actuated, a control signal is fed to said reproducing apparatus to resume the reproducing operation, so that the picture signals are stored in said first storage means, and when a field of picture signals is stored in said first storage means, said reproducing apparatus is again stopped in a reproducing operation, and thus said first storage means stores image data of plural frames of picture signals from said reproducing apparatus, and wherein, in the second mode, said control means generates, when said signal fetching button is actuated, a control signal to repeatedly instruct said reproducing apparatus to perform reproducing and feed forward operations and upon monitoring reproducing forward operations, and upon monitoring reproducing and feed forward states of said reproducing apparatus, generates timing signals for storing the picture signals in said first storage means, forming the reproduced image in said signal processing means and storing the signals of the reduced image into said second storage means.

2. A video printer according to claim 1, wherein said control means includes:

first detecting means for identifying an operating mode between the first and second mode;

second detecting means for detecting when said signal fetching button is actuated;

first signal generating means for producing control signals to instruct storage of signals into said first and second storage means;

second signal generating means for sending out additional control signals to said reproducing apparatus; and monitor means for monitoring the reproducing state in said reproducing apparatus.

3. A video printer according to claim 2, wherein said monitor means detects a status signal synchronous with a synchronization signal included in the picture signals, counts the status signals, and informs said second signal generating means of a resultant count at regular intervals, and said second signal generating means transmits a control signal for instructing said reproducing apparatus to perform the reproducing and feed forward operations during a predetermined period of time in response to said monitor means.

4. A video printer according to claim 1 wherein said control means comprises:

detecting means for detecting when said signal fetching button is actuated;

first signal generating means for sending out the selection signal to said selection and output means in response to a detection result; and second signal generating means for sending out the control signal including the stop signal to said reproducing apparatus in response to the detecting result.

5. A video printer according to claim 1, wherein the control signals derived from said control means are transmitted to said reproducing apparatus on a wireless basis.

6. A video printer according to claim 1, further comprising detecting means for detecting whether or not at least one of said reproducing apparatus and said monitor apparatus is connected thereto, and if not, for invalidating said control means.

* * * * *